(12) United States Patent
Lee et al.

(10) Patent No.: US 11,251,922 B2
(45) Date of Patent: *Feb. 15, 2022

(54) METHOD FOR RECEIVING OR TRANSMITTING DOWNLINK CONTROL SIGNAL IN WIRELESS COMMUNICATION SYSTEM, AND APPARATUS THEREFOR

(71) Applicant: LG ELECTRONICS INC., Seoul (KR)

(72) Inventors: Jihyun Lee, Anyang-si (KR); Seungmin Lee, Anyang-si (KR); Inkwon Seo, Anyang-si (KR); Hanbyul Seo, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 108 days.

This patent is subject to a terminal disclaimer.

(21) Appl. No.: 16/706,364

(22) Filed: Dec. 6, 2019

(65) Prior Publication Data

US 2020/0112412 A1    Apr. 9, 2020

Related U.S. Application Data

(63) Continuation of application No. 14/438,577, filed as application No. PCT/KR2013/010900 on Nov. 28, 2013, now Pat. No. 10,530,549.

(Continued)

(51) Int. Cl.
*H04L 5/00* (2006.01)
*H04W 72/04* (2009.01)

(52) U.S. Cl.
CPC ............ *H04L 5/0053* (2013.01); *H04L 5/001* (2013.01); *H04L 5/0098* (2013.01); *H04W 72/042* (2013.01)

(58) Field of Classification Search
CPC ..... H04L 5/001; H04L 5/0053; H04L 5/0098; H04W 72/042
See application file for complete search history.

(56) References Cited

U.S. PATENT DOCUMENTS

| 10,530,549 | B2 * | 1/2020 | Lee | ......................... | H04L 5/001 |
| 2012/0236813 | A1 * | 9/2012 | Tan | ......................... | H04L 5/001 370/329 |

(Continued)

FOREIGN PATENT DOCUMENTS

| CN | 102164416 | 8/2011 |
| CN | 102573094 | 7/2012 |

OTHER PUBLICATIONS

Intellectual Property Office of India Application No. 1136/MUMNP/2015, Office Action dated Apr. 4, 2019, 7 pages.

(Continued)

*Primary Examiner* — Omer S Mian
(74) *Attorney, Agent, or Firm* — Lee Hong Degerman Kang Waimey

(57) ABSTRACT

The present invention relates to a method for receiving a downlink control signal in a wireless communication system including monitoring EPDCCH (enhanced physical downlink control channel) candidates to decode an EPDCCH in one or two EPDCCH sets on a first serving cell configured for the UE, and receiving a PDSCH (physical downlink shared channel) corresponding to the decoded EPDCCH. The EPDCCH candidates may include EPDCCH candidates for the first serving cell and EPDCCH candidates for a second serving cell scheduled by the first serving cell. Aggregation levels and the number of the EPDCCH candidates for the second serving cell at each of the aggregation levels are associated with bandwidth of the second serving cell.

13 Claims, 12 Drawing Sheets

Related U.S. Application Data

(60) Provisional application No. 61/730,954, filed on Nov. 28, 2012, provisional application No. 61/750,352, filed on Jan. 8, 2013, provisional application No. 61/751,271, filed on Jan. 11, 2013, provisional application No. 61/753,928, filed on Jan. 17, 2013.

(56) References Cited

U.S. PATENT DOCUMENTS

| | | | |
|---|---|---|---|
| 2012/0264468 A1 | 10/2012 | Turtinen et al. | |
| 2013/0195020 A1* | 8/2013 | Frederiksen | H04W 72/042 370/329 |
| 2013/0336263 A1* | 12/2013 | Wang | H04L 47/14 370/329 |
| 2015/0295689 A1 | 10/2015 | Lee et al. | |
| 2016/0014739 A1 | 1/2016 | Papasakellariou et al. | |

OTHER PUBLICATIONS

U.S. Appl. No. 14/438,577, Final Office Action dated Jan. 18, 2019, 17 pages.
U.S. Appl. No. 14/438,577, Final Office Action dated Jun. 5, 2017, 13 pages.
LG Electronics, "UE-specific Search Space Offset Details for Cross-Carrier Scheduling", 3GPP TSG RAN WG1 Meeting #62, R1-104754, Aug. 2010, 6 pages.
LG Electronics, "Details of EPDCCH set configuration," 3GPP TSG-RAN WG1 #70, R1-124322, Oct. 2012, 4 pages.
Renesas Mobile Europe Ltd, "On Number of Blind Decoding Candidates," 3GPP TSG-RAN WG1 #71, R1-125053, Nov. 2012, 8 pages.
LG Electronics, "Details on Search Space and Aggregation Levels," 3GPP TSG-RAN WG1 #71, R1-125367, Nov. 2012, 11 pages.
Samsung, "Remaining Aspects for EPDCCH Operation," 3GPP TSG-RAN WG1 #71, R1-124929, Nov. 2012, 3 pages.
Panasonic, "Cross carrier scheduling with EPDCCH," 3GPP TSG-RAN WG1 #71, R1-124789, Nov. 2012, 2 pages.
European Patent Office Application Serial No. 13858161.6, Search Report dated Aug. 12, 2016, 10 pages.
The State Intellectual Property Office of the People's Republic of China Application Serial No. 201380062244.6, Office Action dated Apr. 21, 2017, 19 pages.
Korean Intellectual Property Office Application No. 10-2015-7010789, Notice of Allowance dated Oct. 15, 2020, 6 pages.
LG Electronics, "UE-specific Search Space Offset Details for Cross-Carrier Scheduling", R1-104754, 3GPP TSG RAN WG1 Meeting #62, Aug. 2010, 6 pages.
Qualcomm Incorporated, "On cross-carrier scheduling with EPDCCH", R1-125112, 3GPP TSG RAN WG1 #71, Nov. 2012, 3 pages.
HTC, "Remaining Details of Search Space and Aggregation Levels of EPDCCH," 3GPP TSG RAN WG1 Meeting #71, R1-124959, Nov. 2012, 12 pages.
Panasonic, "EPDCCH search space and aggregation levels," 3GPP TSG RAN WG1 Meeting #70bis, R1-124241, Oct. 2012, 7 pages.
Alcatel-Lucent Shanghai Bell, et al., "Remaining Details of Search Space and Aggregation Levels," 3GPP TSG RAN WG1 Meeting #70bis, R1-124418, Oct. 2012, 8 pages.
Nokia, et al., "Remaining details on search spaces of EPDCCH," 3GPP TSG RAN WG1 Meeting #70-bis, R1-124184, Oct. 2012, 13 pages.
Panasonic, "EPDCCH search space and aggregation levels," 3GPP TSG RAN WG1 Meeting #70bis, R1-124555, Oct. 2012, 7 pages.
PCT International Application No. PCT/KR2013/010900, Written Opinion of the International Searching Authority dated Mar. 27, 2014, 12 pages.
PCT International Application No. PCT/KR2013/010900, Written Opinion of the International Searching Authority dated Mar. 27, 2014, 16 pages.

\* cited by examiner

FIG. 11
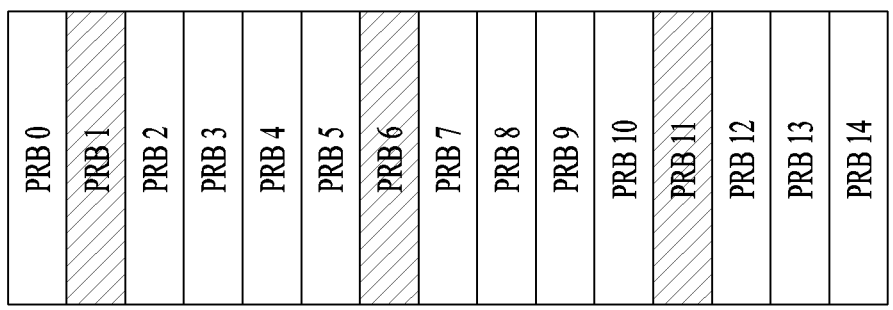
(a)
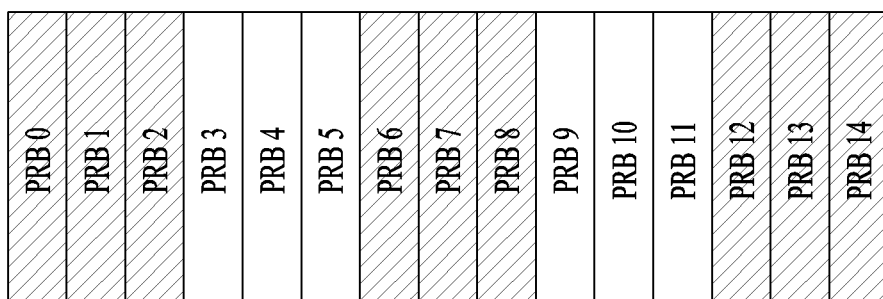
(b)
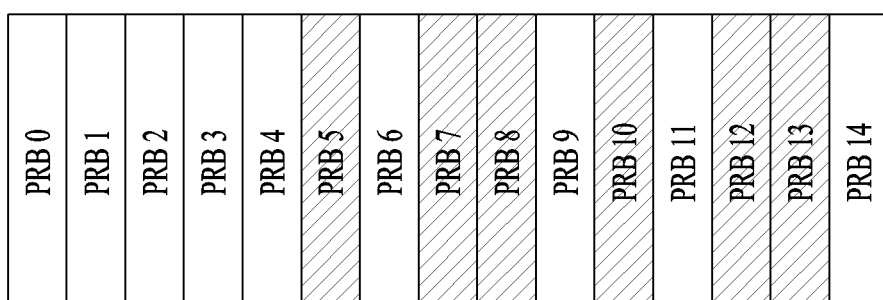
(c)

METHOD FOR RECEIVING OR TRANSMITTING DOWNLINK CONTROL SIGNAL IN WIRELESS COMMUNICATION SYSTEM, AND APPARATUS THEREFOR

CROSS-REFERENCE TO RELATED APPLICATIONS

This application is a continuation of U.S. patent application No. 14/438,577, filed on Apr. 24, 2015, now U.S. Pat. No. 10,530,549, which is the National Stage filing under 35 U.S.C. 371 of International Application No. PCT/KR2013/010900, filed on Nov. 28, 2013, which claims the benefit of U.S. Provisional Application Nos. 61/730,954, filed on Nov. 28, 2012, 61/750,352, filed on Jan. 8, 2013, 61/751,271, filed on Jan.11, 2013 and 61/753,928, filed on Jan. 17, 2013, the contents of which are all hereby incorporated by reference herein in their entirety.

TECHNICAL FIELD

The present invention relates to a wireless communication system, and more particularly, to a method of transmitting or receiving a downlink control signal in a wireless communication system and an apparatus therefor.

BACKGROUND ART

Recently, various devices requiring machine-to-machine (M2M) communication and high data transfer rate, such as smartphones or tablet personal computers (PCs), have appeared and come into widespread use. This has rapidly increased the quantity of data which needs to be processed in a cellular network. In order to satisfy such rapidly increasing data throughput, recently, carrier aggregation (CA) technology which efficiently uses more frequency bands, cognitive ratio technology, multiple antenna (MIMO) technology for increasing data capacity in a restricted frequency, multiple-base-station cooperative technology, etc. have been highlighted. In addition, communication environments have evolved such that the density of accessible nodes is increased in the vicinity of a user equipment (UE). Here, the node includes one or more antennas and refers to a fixed point capable of transmitting/receiving radio frequency (RF) signals to/from the user equipment (UE). A communication system including high-density nodes may provide a communication service of higher performance to the UE by cooperation between nodes.

A multi-node coordinated communication scheme in which a plurality of nodes communicates with a user equipment (UE) using the same time-frequency resources has much higher data throughput than legacy communication scheme in which each node operates as an independent base station (BS) to communicate with the UE without cooperation.

A multi-node system performs coordinated communication using a plurality of nodes, each of which operates as a base station or an access point, an antenna, an antenna group, a remote radio head (RRH), and a remote radio unit (RRU). Unlike the conventional centralized antenna system in which antennas are concentrated at a base station (BS), nodes are spaced apart from each other by a predetermined distance or more in the multi-node system. The nodes can be managed by one or more base stations or base station controllers which control operations of the nodes or schedule data transmitted/received through the nodes. Each node is connected to a base station or a base station controller which manages the node through a cable or a dedicated line.

The multi-node system can be considered as a kind of Multiple Input Multiple Output (MIMO) system since dispersed nodes can communicate with a single UE or multiple UEs by simultaneously transmitting/receiving different data streams. However, since the multi-node system transmits signals using the dispersed nodes, a transmission area covered by each antenna is reduced compared to antennas included in the conventional centralized antenna system. Accordingly, transmit power required for each antenna to transmit a signal in the multi-node system can be reduced compared to the conventional centralized antenna system using MIMO. In addition, a transmission distance between an antenna and a UE is reduced to decrease in pathloss and enable rapid data transmission in the multi-node system. This can improve transmission capacity and power efficiency of a cellular system and meet communication performance having relatively uniform quality regardless of UE locations in a cell. Further, the multi-node system reduces signal loss generated during transmission since base station (s) or base station controller(s) connected to a plurality of nodes transmit/receive data in cooperation with each other. When nodes spaced apart by over a predetermined distance perform coordinated communication with a UE, correlation and interference between antennas are reduced. Therefore, a high signal to interference-plus-noise ratio (SINR) can be obtained according to the multi-node coordinated communication scheme.

Owing to the above-mentioned advantages of the multi-node system, the multi-node system is used with or replaces the conventional centralized antenna system to become a new foundation of cellular communication in order to reduce base station cost and backhaul network maintenance cost while extending service coverage and improving channel capacity and SINR in next-generation mobile communication systems.

DISCLOSURE OF THE INVENTION

Technical Task

An object of the present invention is to propose a method of transmitting or receiving downlink control information in a wireless communication system.

Technical tasks obtainable from the present invention are non-limited the above-mentioned technical task. And, other unmentioned technical tasks can be clearly understood from the following description by those having ordinary skill in the technical field to which the present invention pertains.

Technical Solution

To achieve these and other advantages and in accordance with the purpose of the present invention, as embodied and broadly described, according to one embodiment, a method of receiving a downlink control signal, which is received by a user equipment in a wireless communication system, includes receiving an EPDCCH (enhanced physical downlink control channel) from a downlink serving base station and monitoring a plurality of EPDCCH candidates in an EPDCCH set in the received EPDCCH. The EPDCCH candidates may include candidates for a first component carrier and candidates for a second component carrier, the candidates for the first component carrier and the candidates for the second component carrier may are alternately positioned at each aggregation level L in the EPDCCH set according to a specific ratio, the specific ratio may correspond to a ratio of the number of the candidates for the first component carrier to the number of the candidates for the second component carrier and the number of the candidates for the first component carrier may be equal to or greater than the number of the candidates for the second component carrier.

Preferably, the EPDCCH set may include one or more candidate pairs consisting of n candidates for the first component carrier and one candidate for the second component carrier following the candidates for the first component carrier, where n corresponds to the specific ratio.

Preferably, the EPDCCH set may include one or more candidate pairs consisting of candidates for the first component carrier having an index k to k+n−1 and a candidate for the second component carrier having an index k+n, where n corresponds to the specific ratio and k corresponds to 0 and a multiple of (n+1).

Preferably, the EPDCCH set may be used for a localized transmission.

Preferably, the EPDCCH candidates may have an index 0 to an index $M_p^{(L)}-1$ in an aggregation level L in an EPDCCH set p and the candidates for the second component carrier may have an index according to an equation in the following.

$m+\mathrm{floor}(m*x^{(L)}/y^{(L)})+\mathrm{ceiling}(x^{(L)}/y^{(L)})$. Where m corresponds to 0 to $$\frac{M_p^{(L)}}{y^{(L)}},$$

$x^{(L)}$ corresponds to the number of candidates for the first component carrier in an aggregation level L, $y^{(L)}$ corresponds to the number of candidates for the second component carrier in the aggregation level L, and $M_p^{(L)}$ corresponds to the number of EPDCCH candidates in the aggregation level L in the EPDCCH set p.

Preferably, the candidates for the first component carrier may have indexes except indexes of the candidates for the second component carrier among indexes 0 to $M_p^{(L)}-1$.

Preferably, the method may further include receiving information on the number of EPDCCH candidates for the aggregation level L from the downlink serving base station.

Preferably, the aggregation level L can be determined according to a bandwidth of the first component carrier or the second component carrier.

To further achieve these and other advantages and in accordance with the purpose of the present invention, according to a different embodiment, a user equipment configured to receive a downlink control signal in a wireless communication system includes an RF (radio frequency) unit and a processor configured to control the RF unit, the processor is configured to receive an EPDCCH (enhanced physical downlink control channel) from a downlink serving base station, monitor a plurality of EPDCCH candidates in an EPDCCH set included in the received EPDCCH. The EPDCCH candidates may include candidates for a first component carrier and candidates for a second component carrier, the candidates for the first component carrier and the candidates for the second component carrier may be alternately positioned at each aggregation level in the EPDCCH set according to a specific ratio, the specific ratio may correspond to a ratio of the number of the candidates for the first component carrier to the number of the candidates for the second component carrier and the number of the candidates for the first component carrier may be equal to or greater than the number of the candidates for the second component carrier.

To further achieve these and other advantages and in accordance with the purpose of the present invention, according to a further different embodiment, a base station configured to receive a downlink control signal in a wireless communication system includes an RF (radio frequency) unit and a processor configured to control the RF unit, the processor is configured to transmit an EPDCCH (enhanced physical downlink control channel) to a serving user equipment. The EPDCCH may include at least one or more EPDCCH sets including a plurality of EPDCCH candidates, the EPDCCH candidates may include candidates for a first component carrier and candidates for a second component carrier, the candidates for the first component carrier and the candidates for the second component carrier may be alternately positioned at each aggregation level in the EPDCCH set according to a specific ratio, the specific ratio may correspond to a ratio of the number of the candidates for the first component carrier to the number of the candidates for the second component carrier and the number of the candidates for the first component carrier may be equal to or greater than the number of the candidates for the second component carrier.

The aforementioned solutions are just a part of embodiments of the present invention. Various embodiments to which technical characteristics of the present invention are reflected can be drawn and understood based on detail explanation on the present invention to be described in the following by those skilled in the corresponding technical field.

Advantageous Effects

According to one embodiment of the present invention, it is able to efficiently transmit and receive downlink control information in a wireless communication system according to the present invention.

Effects obtainable from the present invention may be non-limited by the above mentioned effect. And, other unmentioned effects can be clearly understood from the following description by those having ordinary skill in the technical field to which the present invention pertains.

DESCRIPTION OF DRAWINGS

The accompanying drawings, which are included to provide a further understanding of the invention and are incorporated in and constitute a part of this specification, illustrate embodiments of the invention and together with the description serve to explain the principles of the invention.

FIG. 11 is a diagram for an example of indicating a PRB pair included in an EPDCCH set according to one embodiment of the present invention;

BEST MODE

Mode for Invention

Figure 1:
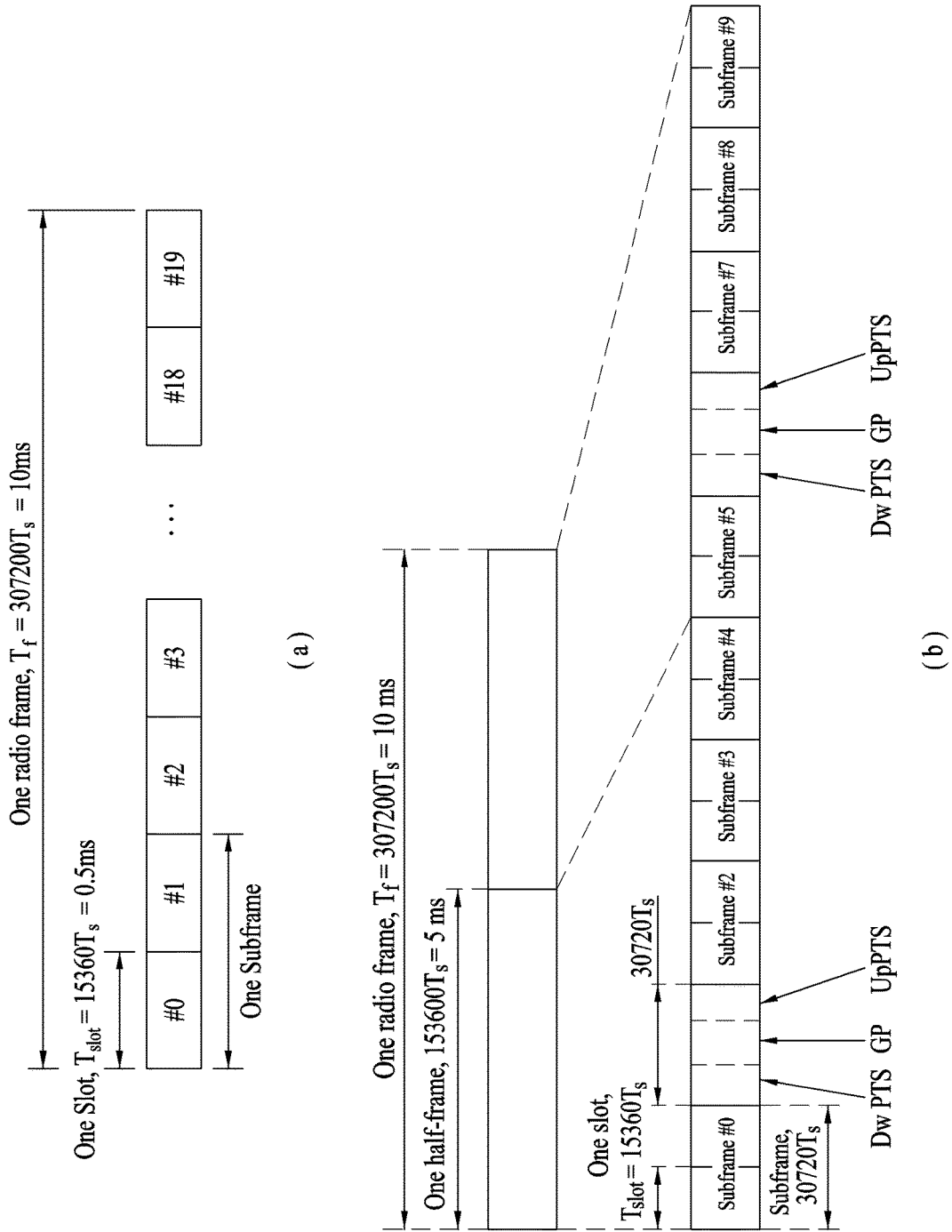
FIG. 1 is a diagram for an example of a radio frame structure used in wireless communication system.

Reference will now be made in detail to the preferred embodiments of the present invention, examples of which are illustrated in the accompanying drawings. The accompanying drawings illustrate exemplary embodiments of the present invention and provide a more detailed description of the present invention. However, the scope of the present invention should not be limited thereto.

In some cases, to prevent the concept of the present invention from being ambiguous, structures and apparatuses of the known art will be omitted, or will be shown in the form of a block diagram based on main functions of each structure and apparatus. Also, wherever possible, the same reference numbers will be used throughout the drawings and the specification to refer to the same or like parts.

In the present invention, a user equipment (UE) is fixed or mobile. The UE is a device that transmits and receives user data and/or control information by communicating with a base station (BS). The term 'UE' may be replaced with 'terminal equipment', 'Mobile Station (MS)', 'Mobile Terminal (MT)', 'User Terminal (UT)', 'Subscriber Station (SS)', 'wireless device', 'Personal Digital Assistant (PDA)', 'wireless modem', 'handheld device', etc. A BS is typically a fixed station that communicates with a UE and/or another BS. The BS exchanges data and control information with a UE and another BS. The term 'BS' may be replaced with 'Advanced Base Station (ABS)', 'Node B', 'evolved-Node B (eNB)', 'Base Transceiver System (BTS)', 'Access Point (AP)', 'Processing Server (PS)', etc. In the following description, BS is commonly called eNB.

In the present invention, a node refers to a fixed point capable of transmitting/receiving a radio signal to/from a UE by communication with the UE. Various eNBs can be used as nodes. For example, a node can be a BS, NB, eNB, pico-cell eNB (PeNB), home eNB (HeNB), relay, repeater, etc. Furthermore, a node may not be an eNB. For example, a node can be a radio remote head (RRH) or a radio remote unit (RRU). The RRH and RRU have power levels lower than that of the eNB. Since the RRH or RRU (referred to as RRH/RRU hereinafter) is connected to an eNB through a dedicated line such as an optical cable in general, cooperative communication according to RRH/RRU and eNB can be smoothly performed compared to cooperative communication according to eNBs connected through a wireless link. At least one antenna is installed per node. An antenna may refer to an antenna port, a virtual antenna or an antenna group. A node may also be called a point. Unlink a conventional centralized antenna system (CAS) (i.e. single node system) in which antennas are concentrated in an eNB and controlled an eNB controller, plural nodes are spaced apart at a predetermined distance or longer in a multi-node system. The plural nodes can be managed by one or more eNBs or eNB controllers that control operations of the nodes or schedule data to be transmitted/received through the nodes. Each node may be connected to an eNB or eNB controller managing the corresponding node via a cable or a dedicated line. In the multi-node system, the same cell identity (ID) or different cell IDs may be used for signal transmission/reception through plural nodes. When plural nodes have the same cell ID, each of the plural nodes operates as an antenna group of a cell. If nodes have different cell IDs in the multi-node system, the multi-node system can be regarded as a multi-cell (e.g. macro-cell/femto-cell/pico-cell) system. When multiple cells respectively configured by plural nodes are overlaid according to coverage, a network configured by multiple cells is called a multi-tier network. The cell ID of the RRH/RRU may be identical to or different from the cell ID of an eNB. When the RRH/RRU and eNB use different cell IDs, both the RRH/RRU and eNB operate as independent eNBs.

In a multi-node system according to the present invention, which will be described below, one or more eNBs or eNB controllers connected to plural nodes can control the plural nodes such that signals are simultaneously transmitted to or received from a UE through some or all nodes. While there is a difference between multi-node systems according to the nature of each node and implementation form of each node, multi-node systems are discriminated from single node systems (e.g. CAS, conventional MIMO systems, conventional relay systems, conventional repeater systems, etc.) since a plurality of nodes provides communication services to a UE in a predetermined time-frequency resource. Accordingly, embodiments of the present invention with respect to a method of performing coordinated data transmission using some or all nodes can be applied to various types of multi-node systems. For example, a node refers to an antenna group spaced apart from another node by a predetermined distance or more, in general. However, embodiments of the present invention, which will be described below, can even be applied to a case in which a node refers to an arbitrary antenna group irrespective of node interval. In the case of an eNB including an X-pole (cross polarized) antenna, for example, the embodiments of the preset invention are applicable on the assumption that the eNB controls a node composed of an H-pole antenna and a V-pole antenna.

A communication scheme through which signals are transmitted/received via plural transmit (Tx)/receive (Rx) nodes, signals are transmitted/received via at least one node selected from plural Tx/Rx nodes, or a node transmitting a downlink signal is discriminated from a node transmitting an uplink signal is called multi-eNB MIMO or CoMP (Coordinated Multi-Point Tx/Rx). Coordinated transmission schemes from among CoMP communication schemes can be categorized into JP (Joint Processing) and scheduling coordination. The former may be divided into JT (Joint Transmission)/JR (Joint Reception) and DPS (Dynamic Point Selection) and the latter may be divided into CS (Coordinated Scheduling) and CB (Coordinated Beamforming). DPS may be called DCS (Dynamic Cell Selection). When JP is performed, more various communication environments can be generated, compared to other CoMP schemes. JT refers to a communication scheme by which plural nodes transmit the same stream to a UE and JR refers to a communication scheme by which plural nodes receive the same stream from the UE. The UE/eNB combine signals received from the plural nodes to restore the stream. In the case of JT/JR, signal transmission reliability can be improved according to transmit diversity since the same stream is transmitted from/to plural nodes. DPS refers to a communication scheme by which a signal is transmitted/received through a node selected from plural nodes according to a specific rule. In the case of DPS, signal transmission reliability can be improved because a node having a good channel state between the node and a UE is selected as a communication node.

In the present invention, a cell refers to a specific geographical area in which one or more nodes provide communication services. Accordingly, communication with a specific cell may mean communication with an eNB or a node providing communication services to the specific cell. A downlink/uplink signal of a specific cell refers to a downlink/uplink signal from/to an eNB or a node providing communication services to the specific cell. A cell providing uplink/downlink communication services to a UE is called a serving cell. Furthermore, channel status/quality of a specific cell refers to channel status/quality of a channel or a communication link generated between an eNB or a node providing communication services to the specific cell and a UE. In 3GPP LTE-A systems, a UE can measure downlink channel state from a specific node using one or more CSI-RSs (Channel State Information Reference Signals) transmitted through antenna port(s) of the specific node on a CSI-RS resource allocated to the specific node. In general, neighboring nodes transmit CSI-RS resources on orthogonal CSI-RS resources. When CSI-RS resources are orthogonal, this means that the CSI-RS resources have different subframe configurations and/or CSI-RS sequences which specify subframes to which CSI-RSs are allocated according to CSI-RS resource configurations, subframe offsets and transmission periods, etc. which specify symbols and subcarriers carrying the CSI RSs.

In the present invention, PDCCH (Physical Downlink Control Channel)/PCFICH (Physical Control Format Indicator Channel)/PHICH (Physical Hybrid automatic repeat request Indicator Channel)/PDSCH (Physical Downlink Shared Channel) refer to a set of time-frequency resources or resource elements respectively carrying DCI (Downlink Control Information)/CFI (Control Format Indicator)/downlink ACK/NACK (Acknowlegement/Negative ACK)/downlink data. In addition, PUCCH (Physical Uplink Control Channel)/PUSCH (Physical Uplink Shared Channel)/PRACH (Physical Random Access Channel) refer to sets of time-frequency resources or resource elements respectively carrying UCI (Uplink Control Information)/uplink data/random access signals. In the present invention, a time-frequency resource or a resource element (RE), which is allocated to or belongs to PDCCH/PCFICH/PHICH/PDSCH/PUCCH/PUSCH/PRACH, is referred to as a PDCCH/PCFICH/PHICH/PDSCH/PUCCH/PUSCH/PRACH RE or PDCCH/PCFICH/PHICH/PDSCH/PUCCH/PUSCH/PRACH resource. In the following description, transmission of PUCCH/PUSCH/PRACH by a UE is equivalent to transmission of uplink control information/uplink data/random access signal through or on PUCCH/PUSCH/PRACH. Furthermore, transmission of PDCCH/PCFICH/PHICH/PDSCH by an eNB is equivalent to transmission of downlink data/control information through or on PDCCH/PCFICH/PHICH/PDSCH.

FIG. 1 illustrates an exemplary radio frame structure used in a wireless communication system. FIG. 1(a) illustrates a frame structure for frequency division duplex (FDD) used in 3GPP LTE/LTE-A and FIG. 1(b) illustrates a frame structure for time division duplex (TDD) used in 3GPP LTE/LTE-A.

Referring to FIG. 1, a radio frame used in 3GPP LTE/LTE-A has a length of 10 ms (307200 Ts) and includes 10 subframes in equal size. The 10 subframes in the radio frame may be numbered. Here, Ts denotes sampling time and is represented as Ts=1/(2048*15 kHz). Each subframe has a length of 1 ms and includes two slots. 20 slots in the radio frame can be sequentially numbered from 0 to 19. Each slot has a length of 0.5 ms. A time for transmitting a subframe is defined as a transmission time interval (TTI). Time resources can be discriminated by a radio frame number (or radio frame index), subframe number (or subframe index) and a slot number (or slot index).

The radio frame can be configured differently according to duplex mode. Downlink transmission is discriminated from uplink transmission by frequency in FDD mode, and thus the radio frame includes only one of a downlink subframe and an uplink subframe in a specific frequency band. In TDD mode, downlink transmission is discriminated from uplink transmission by time, and thus the radio frame includes both a downlink subframe and an uplink subframe in a specific frequency band.

Table 1 shows DL-UL configurations of subframes in a radio frame in the TDD mode.

TABLE 1

| DL-UL configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In Table 1, D denotes a downlink subframe, U denotes an uplink subframe and S denotes a special subframe. The special subframe includes three fields of DwPTS (Downlink Pilot TimeSlot), GP (Guard Period), and UpPTS (Uplink Pilot TimeSlot). DwPTS is a period reserved for downlink transmission and UpPTS is a period reserved for uplink transmission. Table 2 shows special subframe configuration.

TABLE 2

| Special subframe configuration | Normal cyclic prefix in downlink | | | Extended cyclic prefix in downlink | | |
|---|---|---|---|---|---|---|
| | | UpPTS | | | UpPTS | |
| | DwPTS | Normal cyclic prefix in uplink | Extended cyclic prefix in uplink | DwPTS | Normal cyclic prefix in uplink | Extended cyclic prefix in uplink |
| 0 | $6592 \cdot T_s$ | $2192 \cdot T_s$ | $2560 \cdot T_s$ | $7680 \cdot T_s$ | $2192 \cdot T_s$ | $2560 \cdot T_s$ |
| 1 | $19760 \cdot T_s$ | | | $20480 \cdot T_s$ | | |
| 2 | $21952 \cdot T_s$ | | | $23040 \cdot T_s$ | | |
| 3 | $24144 \cdot T_s$ | | | $25600 \cdot T_s$ | | |
| 4 | $26336 \cdot T_s$ | | | $7680 \cdot T_s$ | $4384 \cdot T_s$ | $5120 \cdot T_s$ |
| 5 | $6592 \cdot T_s$ | $4384 \cdot T_s$ | $5120 \cdot T_s$ | $20480 \cdot T_s$ | | |
| 6 | $19760 \cdot T_s$ | | | $23040 \cdot T_s$ | | |
| 7 | $21952 \cdot T_s$ | | | $12800 \cdot T_s$ | | |
| 8 | $24144 \cdot T_s$ | | | — | — | — |

Figure 2:
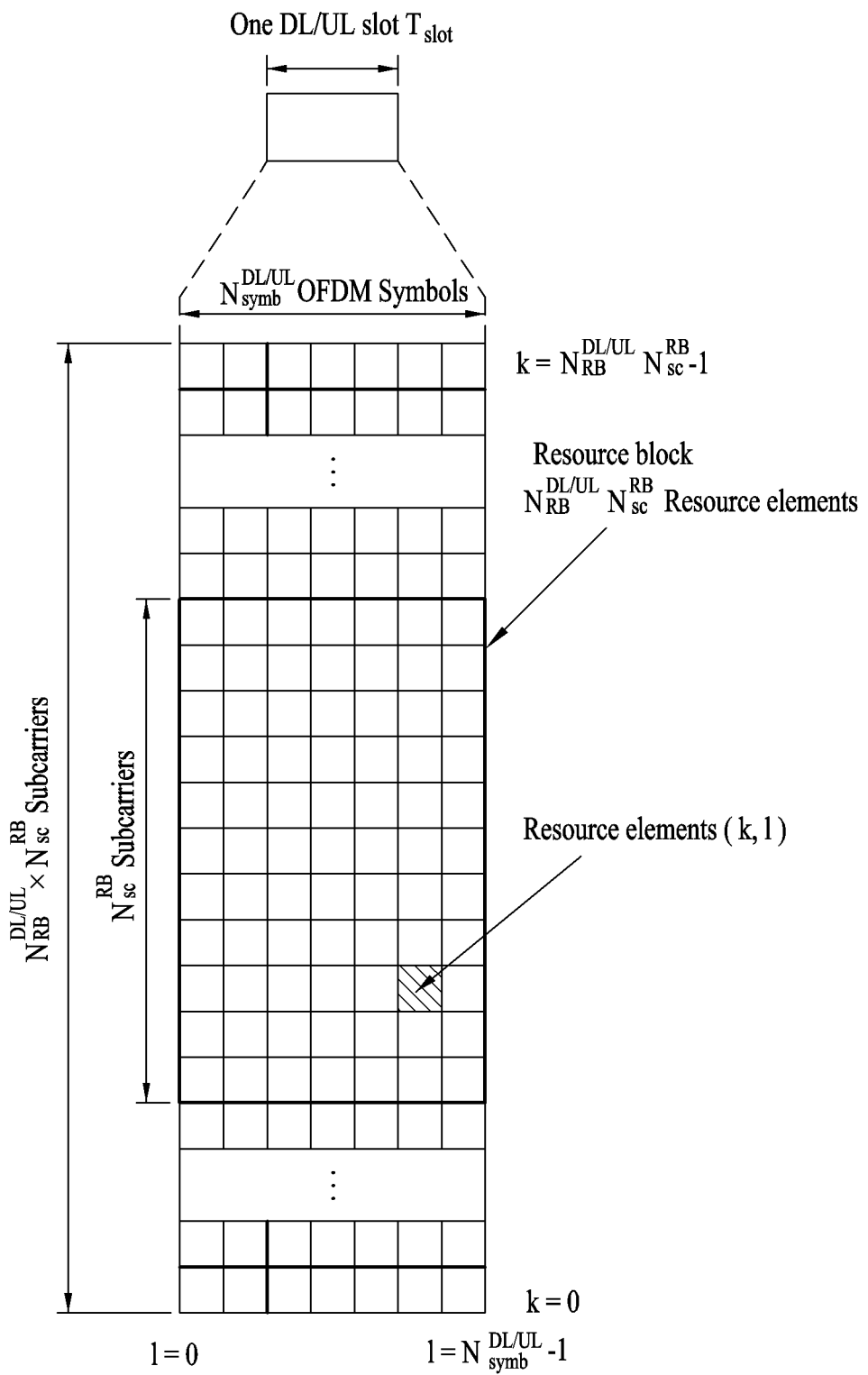
FIG. 2 is a diagram for an example of a downlink (DL)/uplink (UL) slot structure in wireless communication system.

FIG. 2 illustrates an exemplary downlink/uplink slot structure in a wireless communication system. Particularly, FIG. 2 illustrates a resource grid structure in 3GPP LTE/LTE-A. A resource grid is present per antenna port.

Referring to FIG. 2, a slot includes a plurality of OFDM (Orthogonal Frequency Division Multiplexing) symbols in the time domain and a plurality of resource blocks (RBs) in the frequency domain. An OFDM symbol may refer to a symbol period. A signal transmitted in each slot may be represented by a resource grid composed of $N_{RB}^{DL/UL}*N_{sc}^{RB}$ subcarriers and $N_{symb}^{DL/UL}$ OFDM symbols. Here, $N_{RB}^{DL}$ denotes the number of RBs in a downlink slot and $N_{RB}^{UL}$ denotes the number of RBs in an uplink slot. $N_{RB}^{DL}$ and $N_{RB}^{UL}$ respectively depend on a DL transmission bandwidth and a UL transmission bandwidth. $N_{symb}^{DL}$ denotes the number of OFDM symbols in the downlink slot and $N_{symb}^{UL}$ denotes the number of OFDM symbols in the uplink slot. In addition, $N_{sc}^{RB}$ denotes the number of subcarriers constructing one RB.

An OFDM symbol may be called an SC-FDM (Single Carrier Frequency Division Multiplexing) symbol according to multiple access scheme. The number of OFDM symbols included in a slot may depend on a channel bandwidth and the length of a cyclic prefix (CP). For example, a slot includes 7 OFDM symbols in the case of normal CP and 6 OFDM symbols in the case of extended CP. While FIG. 2 illustrates a subframe in which a slot includes 7 OFDM symbols for convenience, embodiments of the present invention can be equally applied to subframes having different numbers of OFDM symbols. Referring to FIG. 2, each OFDM symbol includes $N_{RB}^{DL/UL}*N_{sc}^{RB}$ subcarriers in the frequency domain. Subcarrier types can be classified into a data subcarrier for data transmission, a reference signal subcarrier for reference signal transmission, and null subcarriers for a guard band and a direct current (DC) component. The null subcarrier for a DC component is a subcarrier remaining unused and is mapped to a carrier frequency (f0) during OFDM signal generation or frequency up-conversion. The carrier frequency is also called a center frequency.

An RB is defined by $N_{symb}^{DL/UL}$ (e.g. 7) consecutive OFDM symbols in the time domain and $N_{sc}^{RB}$ (e.g. 12) consecutive subcarriers in the frequency domain. For reference, a resource composed by an OFDM symbol and a subcarrier is called a resource element (RE) or a tone. Accordingly, an RB is composed of $N_{symb}^{DL/UL}*N_{sc}^{RB}$ REs. Each RE in a resource grid can be uniquely defined by an index pair (k, l) in a slot. Here, k is an index in the range of 0 to $N_{symb}^{DL/UL}*N_{sc}^{RB}-1$ in the frequency domain and l is an index in the range of 0 to $N_{symb}^{DL/UL}-1$.

Two RBs, which occupy $N_{sc}^{RB}$ same continuous subcarriers for one subframe and are respectively located at two slots of the subframe, will be referred to as a pair of physical resource blocks (PRB). The two RBs constituting the PRB have the same PRB number (or PRB index). A virtual resource block (VRB) is a logical resource allocation unit for resource allocation. The VRB has the same size as that of the PRB. The VRB may be divided into a localized VRB and a distributed VRB depending on a mapping scheme of VRB into PRB. The localized VRBs are mapped into the PRBs, whereby VRB number (VRB index) corresponds to PRB number. That is, nPRB=nVRB is obtained. Numbers are given to the localized VRBs from 0 to NDLVRB−1, and NDLVRB=NDLRB is obtained. Accordingly, according to the localized mapping scheme, the VRBs having the same VRB number are mapped into the PRBs having the same PRB number at the first slot and the second slot. On the other hand, the distributed VRBs are mapped into the PRBs through interleaving. Accordingly, the VRBs having the same VRB number may be mapped into the PRBs having different PRB numbers at the first slot and the second slot. Two PRBs, which are respectively located at two slots of the subframe and have the same VRB number, will be referred to as a pair of VRBs.

Figure 3:
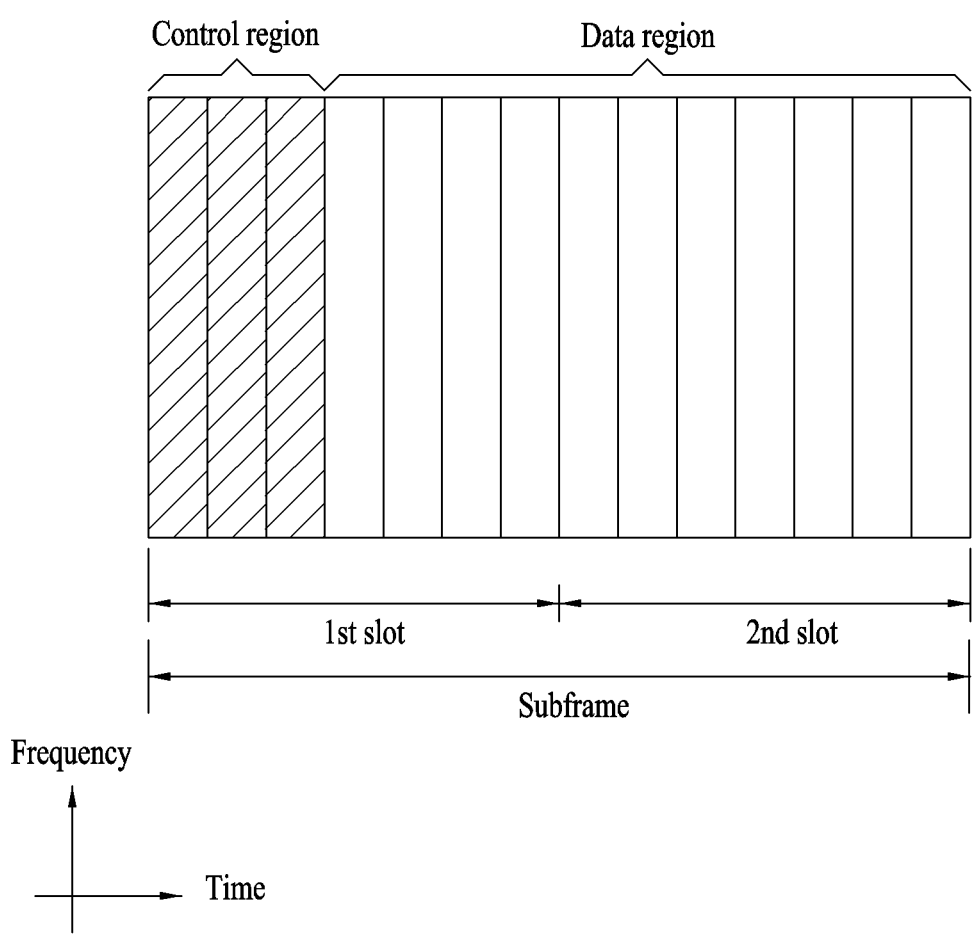
FIG. 3 is a diagram for an example of a downlink (DL) subframe structure used in 3GPP LTE/LTE-A system.

FIG. 3 illustrates a downlink (DL) subframe structure used in 3GPP LTE/LTE-A.

Referring to FIG. 3, a DL subframe is divided into a control region and a data region. A maximum of three (four) OFDM symbols located in a front portion of a first slot within a subframe correspond to the control region to which a control channel is allocated. A resource region available for PDCCH transmission in the DL subframe is referred to as a PDCCH region hereinafter. The remaining OFDM symbols correspond to the data region to which a physical downlink shared chancel (PDSCH) is allocated. A resource region available for PDSCH transmission in the DL subframe is referred to as a PDSCH region hereinafter. Examples of downlink control channels used in 3GPP LTE include a physical control format indicator channel (PCFICH), a physical downlink control channel (PDCCH), a physical hybrid ARQ indicator channel (PHICH), etc. The PCFICH is transmitted at a first OFDM symbol of a subframe and carries information regarding the number of OFDM symbols used for transmission of control channels within the subframe. The PHICH is a response of uplink transmission and carries an HARQ acknowledgment (ACK)/negative acknowledgment (NACK) signal.

Control information carried on the PDCCH is called downlink control information (DCI). The DCI contains resource allocation information and control information for a UE or a UE group. For example, the DCI includes a transport format and resource allocation information of a downlink shared channel (DL-SCH), a transport format and resource allocation information of an uplink shared channel (UL-SCH), paging information of a paging channel (PCH), system information on the DL-SCH, information about resource allocation of an upper layer control message such as a random access response transmitted on the PDSCH, a transmit control command set with respect to individual UEs in a UE group, a transmit power control command, information on activation of a voice over IP (VoIP), downlink assignment index (DAI), etc. The transport format and resource allocation information of the DL-SCH are also called DL scheduling information or a DL grant and the transport format and resource allocation information of the UL-SCH are also called UL scheduling information or a UL grant. The size and purpose of DCI carried on a PDCCH depend on DCI format and the size thereof may be varied according to coding rate. Various formats, for example, formats 0 and 4 for uplink and formats 1, 1A, 1B, 1C, 1D, 2, 2A, 2B, 2C, 3 and 3A for downlink, have been defined in 3GPP LTE. Control information such as a hopping flag, information on RB allocation, modulation coding scheme (MCS), redundancy version (RV), new data indicator (NDI), information on transmit power control (TPC), cyclic shift demodulation reference signal (DMRS), UL index, channel quality information (CQI) request, DL assignment index, HARQ process number, transmitted precoding matrix indicator (TPMI), precoding matrix indicator (PMI), etc. is selected and combined based on DCI format and transmitted to a UE as DCI.

In general, a DCI format for a UE depends on transmission mode (TM) set for the UE. In other words, only a DCI format corresponding to a specific TM can be used for a UE configured in the specific TM.

A PDCCH is transmitted on an aggregation of one or several consecutive control channel elements (CCEs). The CCE is a logical allocation unit used to provide the PDCCH with a coding rate based on a state of a radio channel. The CCE corresponds to a plurality of resource element groups (REGs). For example, a CCE corresponds to 9 REGs and an REG corresponds to 4 REs. 3GPP LTE defines a CCE set in which a PDCCH can be located for each UE. A CCE set from which a UE can detect a PDCCH thereof is called a PDCCH search space, simply, search space. An individual resource through which the PDCCH can be transmitted within the search space is called a PDCCH candidate. A set of PDCCH candidates to be monitored by the UE is defined as the search space. In 3GPP LTE/LTE-A, search spaces for DCI formats may have different sizes and include a dedicated search space and a common search space. The dedicated search space is a UE-specific search space and is configured for each UE. The common search space is configured for a plurality of UEs. The aggregation levels defining the search space are indicated as follows:

TABLE 3

| Search Space | | | |
|---|---|---|---|
| Type | Aggregation Level L | Size [in CCEs] | Number of PDCCH candidates $M^{(L)}$ |
| UE-specific | 1 | 6 | 6 |
|  | 2 | 12 | 6 |
|  | 4 | 8 | 2 |
|  | 8 | 16 | 2 |
| Common | 4 | 16 | 4 |
|  | 8 | 16 | 2 |

A PDCCH candidate corresponds to 1, 2, 4 or 8 CCEs according to CCE aggregation level. An eNB transmits a PDCCH (DCI) on an arbitrary PDCCH candidate with in a search space and a UE monitors the search space to detect the PDCCH (DCI). Here, monitoring refers to attempting to decode each PDCCH in the corresponding search space according to all monitored DCI formats. The UE can detect the PDCCH thereof by monitoring plural PDCCHs. Since the UE does not know the position in which the PDCCH thereof is transmitted, the UE attempts to decode all PDCCHs of the corresponding DCI format for each subframe until a PDCCH having the ID thereof is detected. This process is called blind detection (or blind decoding (BD)).

The eNB can transmit data for a UE or a UE group through the data region. Data transmitted through the data region may be called user data. For transmission of the user data, a physical downlink shared channel (PDSCH) may be allocated to the data region. A paging channel (PCH) and downlink-shared channel (DL-SCH) are transmitted through the PDSCH. The UE can read data transmitted through the PDSCH by decoding control information transmitted through a PDCCH. Information representing a UE or a UE group to which data on the PDSCH is transmitted, how the UE or UE group receives and decodes the PDSCH data, etc. is included in the PDCCH and transmitted. For example, if a specific PDCCH is CRC (cyclic redundancy check)-masked having radio network temporary identify (RNTI) of "A" and information about data transmitted using a radio resource (e.g. frequency position) of "B" and transmission format information (e.g. transport block size, modulation scheme, coding information, etc.) of "C" is transmitted through a specific DL subframe, the UE monitors PDCCHs using RNTI information and a UE having the RNTI of "A" detects a PDCCH and receives a PDSCH indicated by "B" and "C" using information about the PDCCH.

A reference signal (RS) to be compared with a data signal is necessary for the UE to demodulate a signal received from the eNB. A reference signal refers to a predetermined signal having a specific waveform, which is transmitted from the eNB to the UE or from the UE to the eNB and known to both the eNB and UE. The reference signal is also called a pilot. Reference signals are categorized into a cell-specific RS shared by all UEs in a cell and a modulation RS (DM RS) dedicated for a specific UE. A DM RS transmitted by the eNB for demodulation of downlink data for a specific UE is called a UE-specific RS. Both or one of DM RS and CRS may be transmitted on downlink. When only the DM RS is transmitted without CRS, an RS for channel measurement needs to be additionally provided because the DM RS transmitted using the same precoder as used for data can be used for demodulation only. For example, in 3GPP LTE(-A), CSI-RS corresponding to an additional RS for measurement is transmitted to the UE such that the UE can measure channel state information. CSI-RS is transmitted in each transmission period corresponding to a plurality of subframes based on the fact that channel state variation with time is not large, unlike CRS transmitted per subframe.

Figure 4:
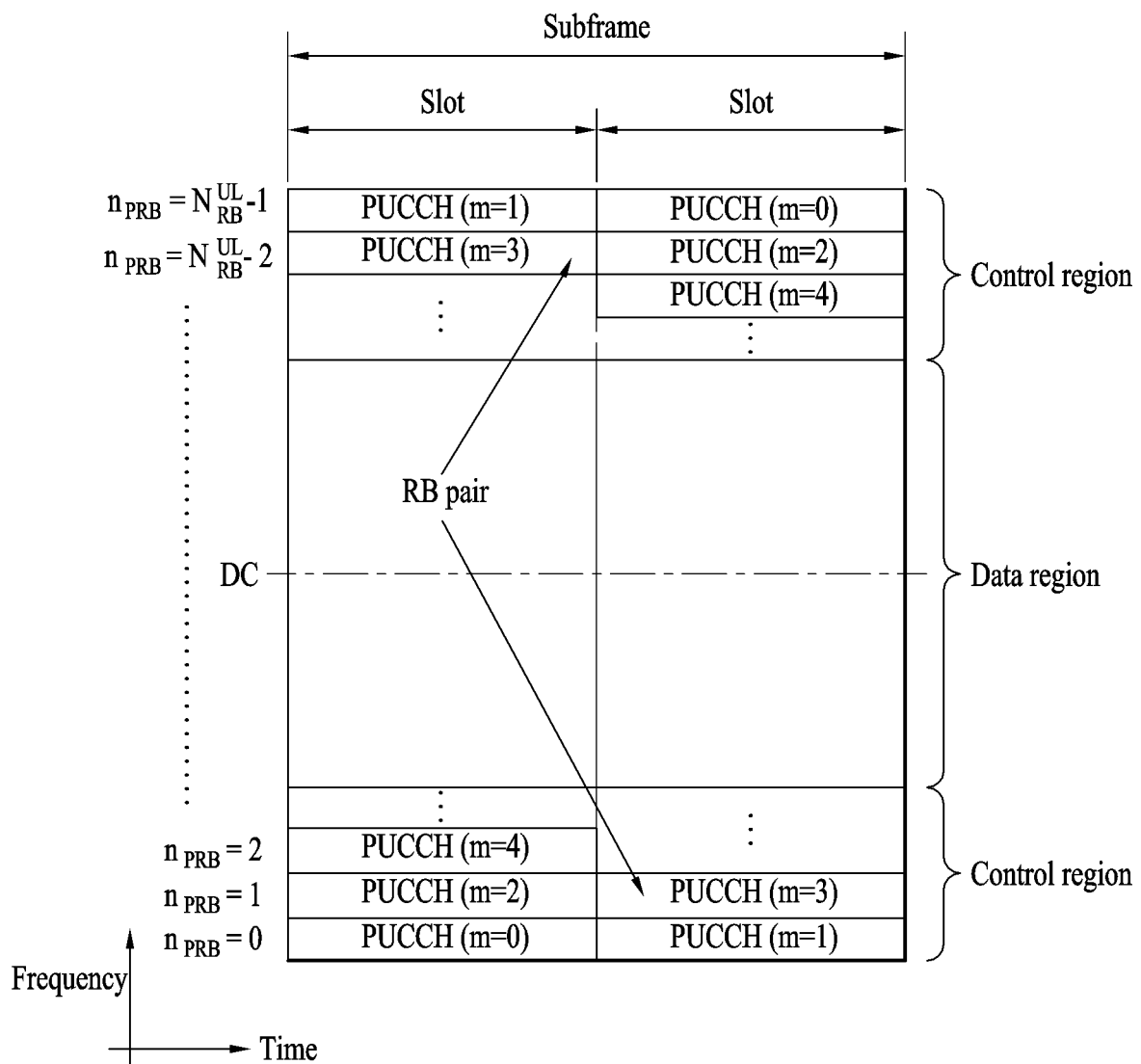
FIG. 4 is a diagram for an example of an uplink (UL) subframe structure used in 3GPP LTE/LTE-A system.

FIG. 4 illustrates an exemplary uplink subframe structure used in 3GPP LTE/LTE-A.

Referring to FIG. 4, a UL subframe can be divided into a control region and a data region in the frequency domain. One or more PUCCHs (physical uplink control channels) can be allocated to the control region to carry uplink control information (UCI). One or more PUSCHs (Physical uplink shared channels) may be allocated to the data region of the UL subframe to carry user data.

In the UL subframe, subcarriers spaced apart from a DC subcarrier are used as the control region. In other words, subcarriers corresponding to both ends of a UL transmission bandwidth are assigned to UCI transmission. The DC subcarrier is a component remaining unused for signal transmission and is mapped to the carrier frequency f0 during frequency up-conversion. A PUCCH for a UE is allocated to an RB pair belonging to resources operating at a carrier frequency and RBs belonging to the RB pair occupy different subcarriers in two slots. Assignment of the PUCCH in this manner is represented as frequency hopping of an RB pair allocated to the PUCCH at a slot boundary. When frequency hopping is not applied, the RB pair occupies the same subcarrier.

The PUCCH can be used to transmit the following control information.

Scheduling Request (SR): This is information used to request a UL-SCH resource and is transmitted using On-Off Keying (OOK) scheme.

HARQ ACK/NACK: This is a response signal to a downlink data packet on a PDSCH and indicates whether the downlink data packet has been successfully received. A 1-bit ACK/NACK signal is transmitted as a response to a single downlink codeword and a 2-bit ACK/NACK signal is transmitted as a response to two downlink codewords. HARQ-ACK responses include positive ACK (ACK), negative ACK (NACK), discontinuous transmission (DTX) and NACK/DTX. Here, the term HARQ-ACK is used interchangeably with the term HARQ ACK/NACK and ACK/NACK.

Channel State Indicator (CSI): This is feedback information about a downlink channel. Feedback information regarding MIMO includes a rank indicator (RI) and a precoding matrix indicator (PMI).

The quantity of control information (UCI) that a UE can transmit through a subframe depends on the number of SC-FDMA symbols available for control information transmission. The SC-FDMA symbols available for control information transmission correspond to SC-FDMA symbols other than SC-FDMA symbols of the subframe, which are used for reference signal transmission. In the case of a subframe in which a sounding reference signal (SRS) is configured, the last SC-FDMA symbol of the subframe is excluded from the SC-FDMA symbols available for control information transmission. A reference signal is used to detect coherence of the PUCCH. The PUCCH supports various formats according to information transmitted thereon. Table 4 shows the mapping relationship between PUCCH formats and UCI in LTE/LTE-A.

TABLE 4

| PUCCH format | Modulation scheme | Number of bits per subframe, $M_{bit}$ | Usage | Etc. |
|---|---|---|---|---|
| 1 | N/A | N/A | SR (Scheduling Request) | |
| 1a | BPSK | 1 | ACK/NACK or SR + ACK/NACK | One codeword |
| 1b | QPSK | 2 | ACK/NACK or SR + ACK/NACK | Two codeword |
| 2 | QPSK | 20 | CQI/PMI/RI | Joint coding ACK/NACK (extended CP) |
| 2a | QPSK + BPSK | 21 | CQI/PMI/RI + ACK/NACK | Normal CP only |
| 2b | QPSK + QPSK | 22 | CQI/PMI/RI + ACK/NACK | Normal CP only |
| 3 | QPSK | 48 | ACK/NACK or SR + ACK/NACK or CQI/PMI/RI + ACK/NACK | |

Referring to Table 4, PUCCH formats 1/1a/1b are used to transmit ACK/NACK information, PUCCH format 2/2a/2b are used to carry CSI such as CQI/PMI/RI and PUCCH format 3 is used to transmit ACK/NACK information.

Reference Signal (RS)

When a packet is transmitted in a wireless communication system, signal distortion may occur during transmission since the packet is transmitted through a radio channel. To correctly receive a distorted signal at a receiver, the distorted signal needs to be corrected using channel information. To detect channel information, a signal known to both a transmitter and the receiver is transmitted and channel information is detected with a degree of distortion of the signal when the signal is received through a channel. This signal is called a pilot signal or a reference signal.

When data is transmitted/received using multiple antennas, the receiver can receive a correct signal only when the receiver is aware of a channel state between each transmit antenna and each receive antenna. Accordingly, a reference signal needs to be provided per transmit antenna, more specifically, per antenna port.

Reference signals can be classified into an uplink reference signal and a downlink reference signal. In LTE, the uplink reference signal includes:

i) a demodulation reference signal (DMRS) for channel estimation for coherent demodulation of information transmitted through a PUSCH and a PUCCH; and ii) a sounding reference signal (SRS) used for an eNB to measure uplink channel quality at a frequency of a different network.

The downlink reference signal includes:

i) a cell-specific reference signal (CRS) shared by all UEs in a cell;

ii) a UE-specific reference signal for a specific UE only;

iii) a DMRS transmitted for coherent demodulation when a PDSCH is transmitted;

iv) a channel state information reference signal (CSI-RS) for delivering channel state information (CSI) when a downlink DMRS is transmitted;

v) a multimedia broadcast single frequency network (MBSFN) reference signal transmitted for coherent demodulation of a signal transmitted in MBSFN mode; and vi) a positioning reference signal used to estimate geographic position information of a UE.

Reference signals can be classified into a reference signal for channel information acquisition and a reference signal for data demodulation. The former needs to be transmitted in a wide band as it is used for a UE to acquire channel information on downlink transmission and received by a UE even if the UE does not receive downlink data in a specific subframe. This reference signal is used even in a handover situation. The latter is transmitted along with a corresponding resource by an eNB when the eNB transmits a downlink signal and is used for a UE to demodulate data through channel measurement. This reference signal needs to be transmitted in a region in which data is transmitted.

General EPDCCH (Enhanced PDCCH)

Owing to introduction of a multi-node system, although various communication schemes becomes available in a manner that channel quality improvement is achieved, introduction of a new control channel is being requested to apply the above-mentioned MIMO scheme and inter-cell coordinated communication scheme to the multi-node environment. Due to the above necessity, introduction of a new control channel is an Enhanced PDCCH (EPDCCH) is being intensively discussed, and the new control channel can be allocated to a data region (hereinafter referred to as a PDSCH region) instead of the legacy control region (hereinafter referred to as a PDCCH region). As a result, node control information can be transmitted per UE through EPDCCH, such that the problem of insufficiency of the legacy PDCCH region can also be solved. For reference, EPDCCH is not applied to the legacy UE, and can be received by the LTE-A UE only.

Figure 5:
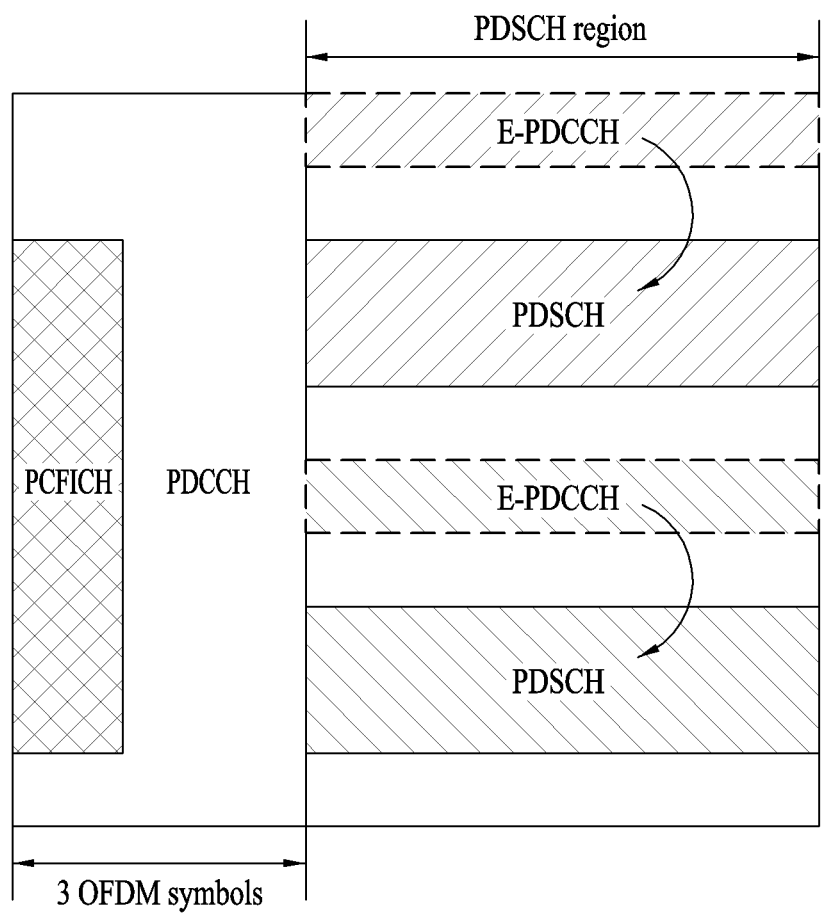
FIG. 5 is a diagram for an EPDCCH (enhanced physical downlink control channel)

FIG. 5 is a conceptual diagram illustrating a carrier aggregation (CA) scheme.

Referring to FIG. 5, EPDCCH may define and use some parts of the PDSCH region configured to transmit data, and the UE has to perform blind decoding for detecting the presence or absence of EPDCCH. EPDCCH performs the same scheduling operation (i.e., PDSCH, PUSCH control) as in the legacy PDCCH. If the number of UEs connected to the same node as in RRH increases, many more EPDCCHs are allocated to the PDSCH region, such that the number of blind decoding times to be executed by the UE increases, resulting in increased complexity.

Meanwhile, a method for multiplexing EPDCCH for a plurality of UEs needs to be considered. In more detail, according to the multiplexing scheme proposed by the present invention, on the condition that a common resource region (i.e., a common PRB set) is configured, EPDCCHs of multiple UEs can be cross-interleaved to the frequency domain or the time domain.

Figure 6:
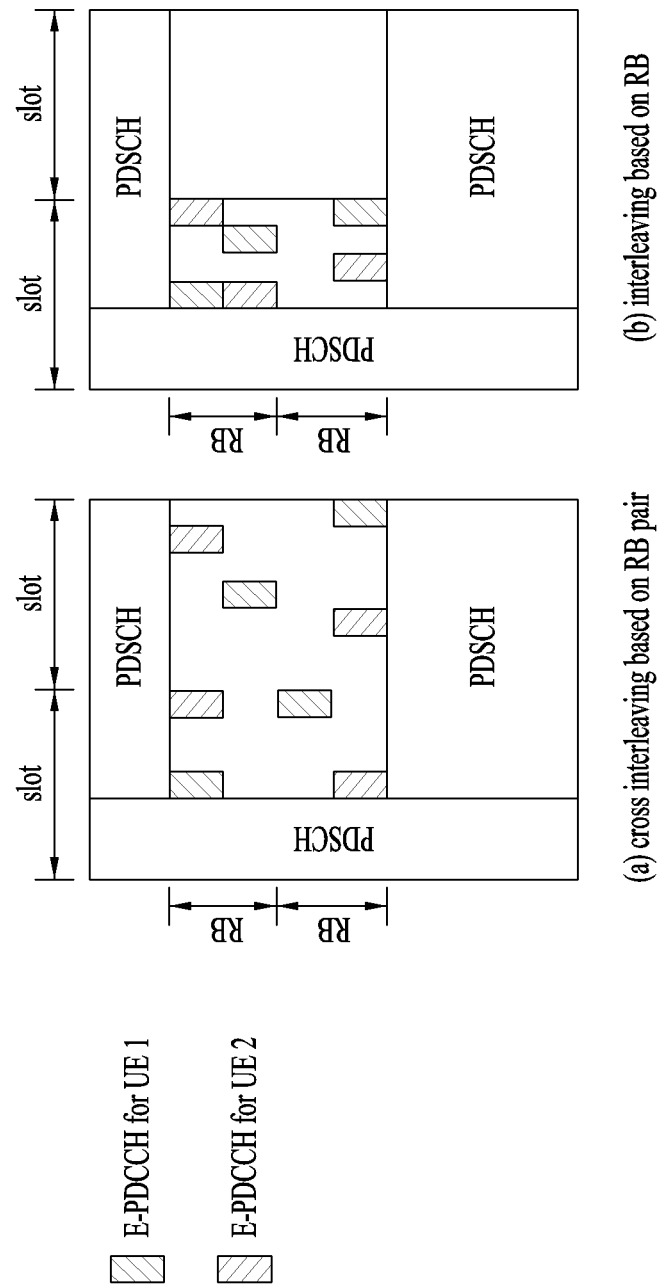
FIG. 6 is a diagram for an EPDCCH (enhanced physical downlink control channel)

FIG. 6 is a conceptual diagram illustrating a method for multiplexing EPDCCH for a plurality of UEs.

Specifically, FIG. 6(a) shows an example in which a common PRB set is configured on the basis of a PRB pair and cross increasing is performed on the basis of the common PRB set. In contrast, FIG. 6(b) shows another example in which a common PRB set is configured on a basis of a PRB and cross interleaving is performed on the basis of the common PRB set. The schemes of FIGS. 6(a) and 6(b) have advantages in which a diversity gain of the time/frequency domains extending a plurality of RBs can be obtained.

Carrier Aggregation (CA)

Figure 7:
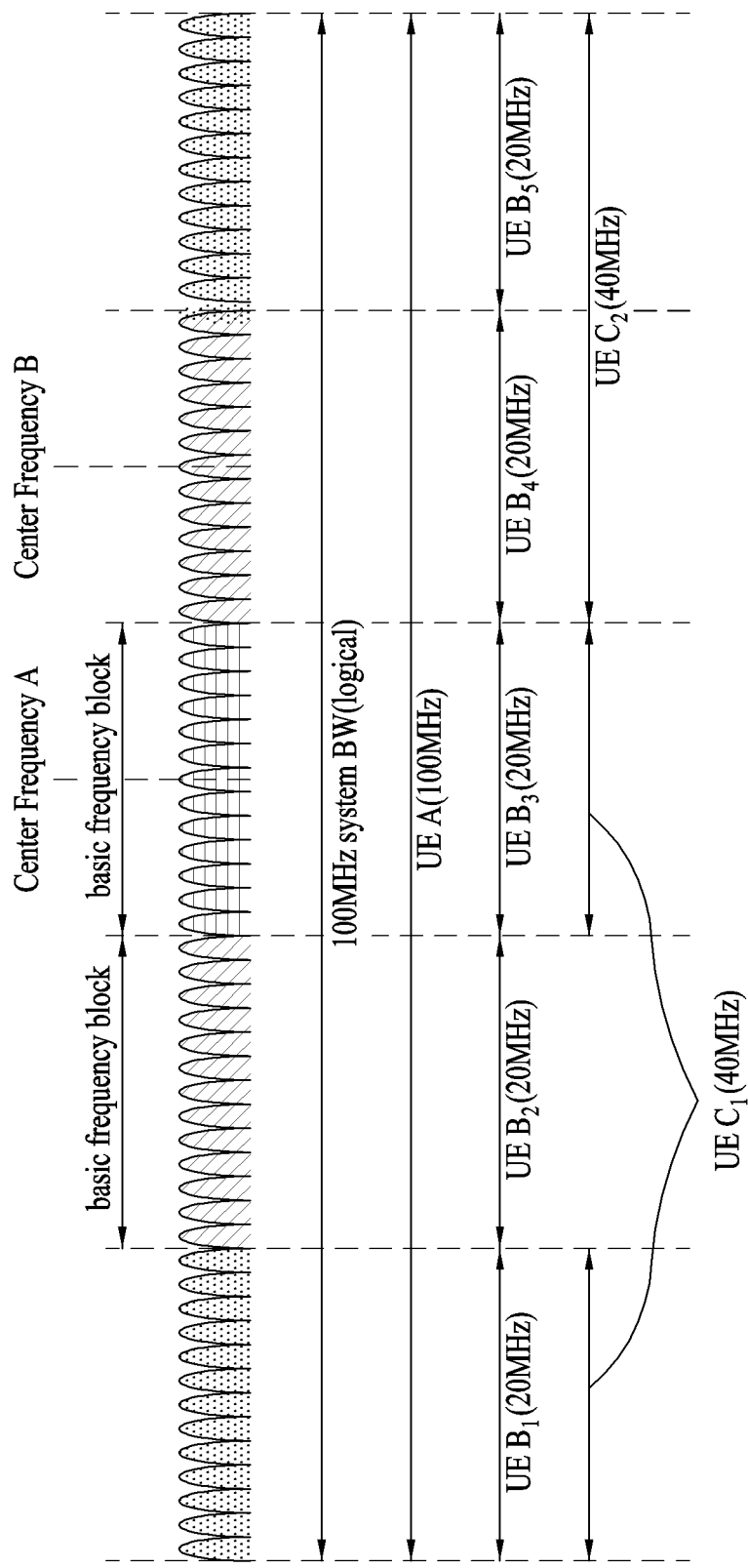
FIG. 7 is a conceptual diagram for explaining a carrier aggregation (CA) scheme.

Carrier aggregation will hereinafter be described in detail. FIG. 7 is a conceptual diagram illustrating carrier aggregation (CA).

Carrier aggregation refers to a method for allowing a UE to use a plurality of frequency blocks or (logical) cells, each of which is composed of uplink resources (or CCs) and/or downlink resources (or CCs), as one large logical band so as to provide a wireless communication system with a wider frequency bandwidth. For convenience of description and better understanding of the present invention, carrier aggregation will hereinafter be referred to as a component carrier (CC).

Referring to FIG. 7, the entire system bandwidth (System BW) includes a bandwidth of 100 MHz as a logical bandwidth. The entire system bandwidth (system BW) includes five component carriers (CCs) and each CC has a maximum bandwidth of 20 MHz. The CC includes one or more physically contiguous subcarriers. Although all CCs have the same bandwidth in FIG. 7, this is only exemplary and the CCs may have different bandwidths. Although the CCs are shown as being contiguous in the frequency domain in FIG. 8, FIG. 8 merely shows the logical concept and thus the CCs may be physically contiguous or separated.

Different center frequencies may be used for the CCs or one common center frequency may be used for physically contiguous CCs. For example, in FIG. 7, if it is assumed that all CCs are physically contiguous, a center frequency A may be used. If it is assumed that CCs are not physically contiguous, a center frequency A, a center frequency B and the like may be used for the respective CCs.

In the present specification, the CC may correspond to a system band of a legacy system. By defining the CC based on the legacy system, it is possible to facilitate backward compatibility and system design in a radio communication environment in which an evolved UE and a legacy UE coexist. For example, if the LTE-A system supports carrier aggregation, each CC may correspond to the system band of the LTE system. In this case, the CC may have any one bandwidth such as 1.25, 2.5, 5, 10 or 20 MHz.

In the case in which the entire system band is extended by carrier aggregation, a frequency band used for communication with each UE is defined in CC units. A UE A may use 100 MHz which is the bandwidth of the entire system band and perform communication using all five CCs. Each of UEs B1 to B5 may only use a bandwidth of 20 MHz and perform communication using one CC. Each of UEs C1 and C2 may use a bandwidth of 40 MHz and perform communication using two CCs. The two CCs may be contiguous or non-contiguous. The UE C1 uses two non-contiguous CCs and the UE C2 uses two contiguous CCs.

One downlink CC and one uplink CC may be used in the LTE system and several CCs may be used in the LTE-A system. At this time, a method of scheduling a data channel by a control channel may be divided into a linked carrier scheduling method and a cross carrier scheduling method.

More specifically, in the linked carrier scheduling method, similarly to the LTE system using a single CC, a control channel transmitted via a specific CC schedules only a data channel via the specific CC.

In contrast, in the cross carrier scheduling method, a control channel transmitted via a primary CC using a carrier indicator field (CIF) schedules a data channel transmitted via the primary CC or another CC.

Figure 8:
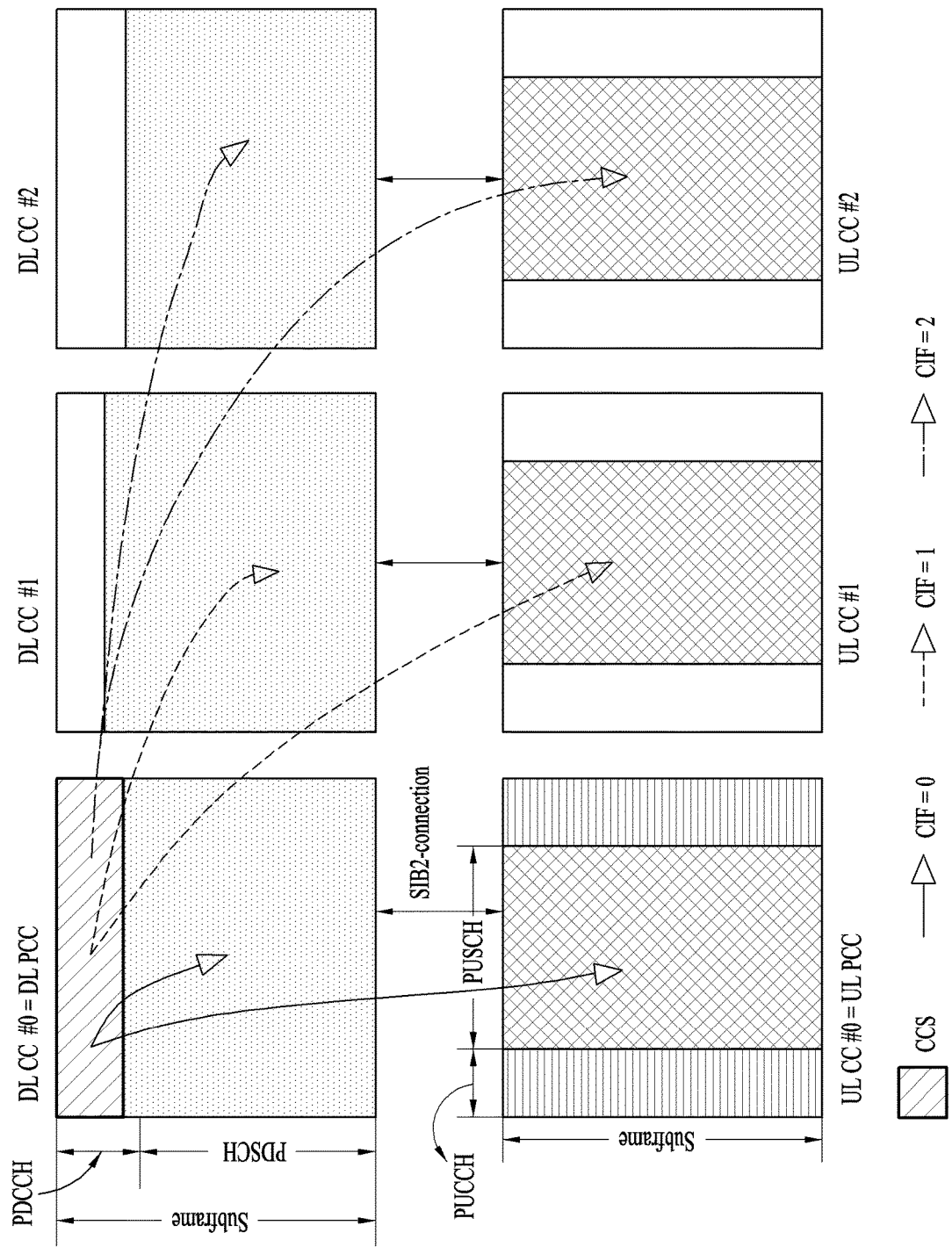
FIG. 8 is a diagram for an example to which a cross carrier scheduling scheme is applied.

FIG. 8 is a conceptual diagram of a cross carrier scheduling scheme. Specifically, as can be seen from FIG. 8, the number of cells (or CCs) allocated to a relay node (RN) is set to 3, cross carrier scheduling is carried out using a CIF as described above. In this case, it is assumed that a downlink cell (or CC) #0 and a uplink cell (or CC) #0 is set to a primary downlink CC (i.e., a primary cell PCell) and a primary uplink downlink CC, and the remaining CCs are used as secondary cells (SCells).

The present invention relates to EPDCCH configuration, more particularly, to a method of selecting the number of PRBs allocated to EPDCCH and a method of signaling the number of PRBs.

EPDCCH is designed to enhance capacity of a control channel and EPDCCH can be transmitted to a legacy PDSCH region based on a DMRS to obtain beamforming gain and the like. In order to transmit EPDCCH, an eNB (or network) can signal to each UE for a region to which EPDCCH is transmittable. In more particular, the eNB can inform a UE of the K number of EPDCCH sets. Each EPDCCH set consists of the N number of PRB pairs and EPDCCH sets different from each other may have an N value different from each other. Each EPDCCH set can be classified into an EPDCCH set used for transmitting a localized EPDCCH and an EPDCCH set used for transmitting a distributed EPDCCH. Each EPDCCH set can be partly or wholly overlapped with a different EPDCCH set.

Configuration of N

N corresponds to the number of PRBs constructing each EPDCCH set. The N can be influenced by a bandwidth of a scheduling cell (hereinafter, PCell) of EPDCCH and a bandwidth value of a scheduled cell (hereinafter, Scell), which is scheduled by the EPCDDH. If the PCell does not have sufficient BW (e.g., narrowband system), since a resource capable of being allocated for the EPDCCH is restricted, it is necessary to configure the N with a relatively smaller value. Hence, the number of RBs capable of being configured for the EPDCCH is restricted depending on the BW of the PCell. While the BW of the PCell relates to the upper limit of the N which is allocated to transmit the EPDCCH, the bandwidth of the SCell relates to the lowest limit of the N which is allocated to transmit the EPDCCH. This is because, since EPDCCH DCI payload has a bigger value as the BW of the SCell is getting wider, the number of RBs minimally required to transmit a corresponding DCI is increasing. Hence, the N should be configured by a value greater than the number of RBs minimally required to transmit EPDCCH according to the BW of the SCell in consideration of both the BW of the PCell and the BW of the SCell. The upper limit of the N becomes a value of the number of RBs capable of being maximally allocated by the PCell to transmit EPDCCH.

Hence, the N value can be appropriately selected on the basis of the BW of the PCell transmitting the EPDCCH. As a method of selecting the N value, it may be able to determine a specific threshold BW value, T1. If a BW is equal to or less than the threshold value, the N is configured by N1. If the BW is greater than the T1, the N is configured by N2 (N1<=N2). In this case, the N1 and the N2 may correspond to a set of Ns capable of being configured. It is also possible to configure the threshold value by two or more steps. For instance, N can be determined as follows.

If BW<=T1, then N1 (e.g., {2,4})
Otherwise, N2 (e.g., {4,8})

In particular, if a BW is equal to or less than a T1 RB, the N may have a value of 2 or 4. If a BW is greater than the T1 RB, the N may have a value of 4 or 8.

As a different method, the N value can be appropriately selected on the basis of the BW of the SCell scheduled by the EPDCCH. As a method of selecting the N value, it may be able to determine a specific threshold BW value, T2. If a BW is equal to or less than the threshold value, the N is configured by N3. If the BW is greater than the T1, the N is configured by N4 (N3<=N4). In this case, the N3 and the N4 may correspond to a set of Ns capable of being configured.

It is also possible to configure the threshold value by two or more steps. For instance, N can be determined as follows.

If BW<=T2, then N3 (e.g., {2,4})
Otherwise, N4 (e.g., {4,8})

In particular, if a BW is equal to or less than a T2 RB, the N may have a value of 2 or 4. If a BW is greater than the T2 RB, the N may have a value of 4 or 8.

A threshold value for a PCell and a threshold value for an SCell can be applied at the same time. In this case, among BW combinations between the PCell and the SCell, an N value capable of being configured between the PCell and the SCell may be different from each other in some BW combinations. In this case, it may use a configuration value of a cell including a smaller N value among the PCell and the SCell. In other word, while a range of an N value capable of being configured is determined based on a BW of the SCell, the N is restricted within a range of the maximum number of RBs capable of being allocated by the PCell.

Figure 9:
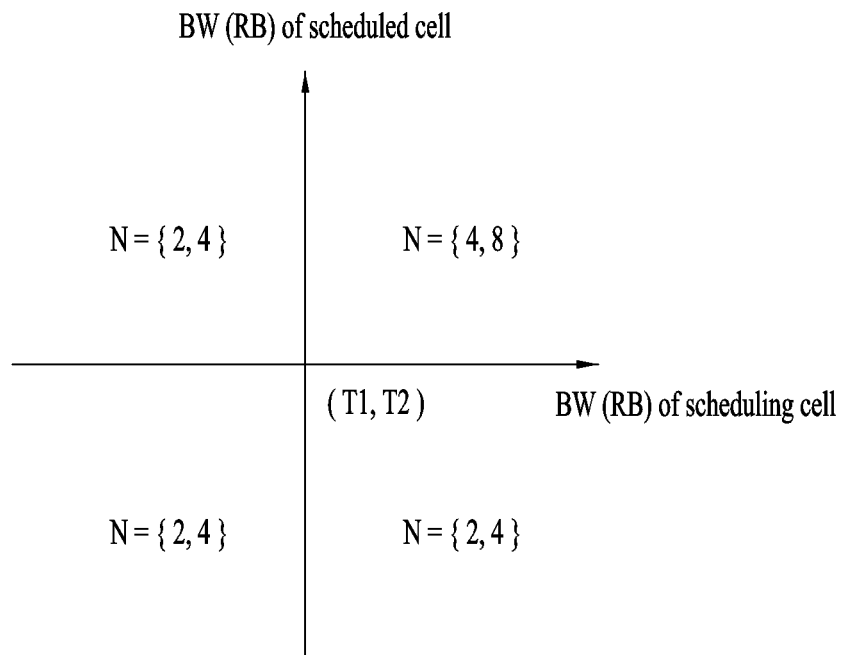
FIG. 9 is a diagram for an example of determining the number of PRB pairs included in an EPDCCH set according to one embodiment of the present invention.

For instance, as mentioned earlier in the foregoing example, when the threshold value of the PCell and the threshold value of the SCell are applied at the same time, an available configuration range of the N may correspond to a range shown in FIG. 9. When the SCell supports {4, 8}, if the PCell supports {2, 4} only (BW of scheduling cell=<T1 and BW of scheduled cell>T2), it may follow a value of the PCell. Similarly, when the PCell supports {4, 8}, if the SCell supports {2, 4} only (BW of scheduling cell>T1 and BW of scheduled cell=<T2), it may follow a value of the Scell.

After the N is determined, a method of signaling to a UE for the N is explained in the following.

First of all, as a method of informing a UE of an index value of a configurable N, when there exist two configurable N values like a case of using the T1 threshold, it may be able to more simply use 1-bit flag. For instance, when a flag corresponds to 0, if a BW is equal to or less than T1, N corresponds to 2. If a BW is greater than T1, N corresponds to 4. When the flag corresponds to 1, if a BW is equal to or less than T1, N corresponds to 4. If a BW is greater than T1, N corresponds to 8.

As a different method, it may be able to select an N value from available N values in a manner of configuring a specific threshold value and determining whether a UE exceeds the threshold value. The threshold value can be configured for the number of available REs/PRBs etc. For instance, it may be able to define as follows.

Figure 10:
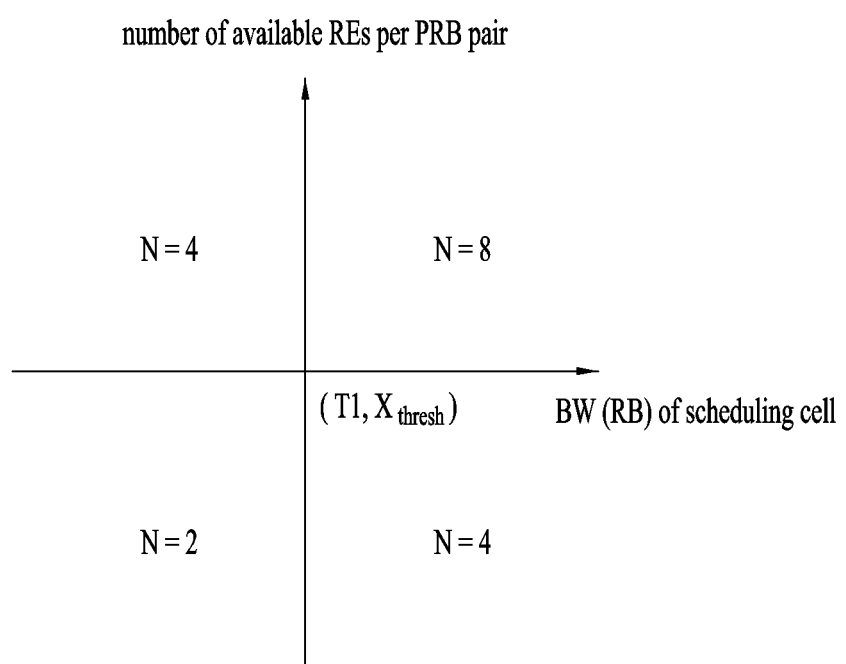
FIG. 10 is a diagram for an example of determining the number of PRB pairs included in an EPDCCH set according to one embodiment of the present invention.

The number of available REs/PRB pairs<$X_{thresh}$ (=104)
If BW=<T1, then N={4}
Otherwise, N={8}
The number of available REs/PRB pairs>=$X_{thresh}$ (=104)
If BW=<T1, then N={2}
Otherwise, N={4}
FIG. 10 shows the definition.

PRBs Allocated for an EPDCCH Set

As mentioned in the foregoing description, each EPDCCH set can consist of the N number of PRB pairs and a UE can obtain configuration for the N number of PRB pairs constructing EPDCCH set via RRC signaling and the like. In this case, information on a PRB used as EPDCCH among the total PRB sets can be delivered to the UE by a method described in the following.

First of all, there is a method of using a bitmap. For instance, when a whole downlink system bandwidth consists of the $N_{tot}$ number of RBs, it may be able to inform a UE of whether each RB is allocated to EPDCCH using the $N_{tot}$ number of bits. If an $n^{th}$ bit is enabled (i.e., "1"), it may indicate that an $n^{th}$ RB is allocated to EPDCCH. It is not mandatory to sequentially map a bit indicating an RB.

Instead, it is able to map RB-to-bit according to a predetermined rule. Two or more RBs may form a group, EPDCCH can be allocated to an RB group and the group can be indicated by a bitmap.

FIG. 11 shows an example for a case that a whole band is constructed by 15 RBs for clarity. As shown in FIG. 11, a bitmap can be configured as (a) 010000100001000, (b) 111000111000111 and (c) 000001011010110. As shown in FIG. 11 (b), if 3 RBs form a group, a bitmap can be configured as (b) 10101.

As a different method, there is a method of signaling a combination of a number of a starting RB and the number of contiguous RBs.

As a different method, if there is a predetermined pattern, it may be able to deliver information on a PRB allocated to EPDCCH in a manner of signaling an index of the corresponding pattern. For instance, when the N numbers of RBs are allocated to EPDCCH, it may be able to consider the floor (system bandwidth/N) number of patterns making the N number of RBs to be distributed to a whole system bandwidth with an identical space. An eNB can indicate corresponding allocation using a ceiling (log 2 (number of pattern)) bit.

FIG. 11 (a) corresponds to a case that $N_{tot}$=15 and N=3. If a pattern, which is distributed to the whole system bandwidth with an identical space, is defined, an interval between RBs constructing a specific pattern becomes 5 RBs (15 RB/3) and there exist 5 patterns. If a smallest RB index of each pattern is used as an index of the pattern, FIG. 11 (a) shows a pattern corresponding to 'index=1' among the 5 patterns.

If a random starting PRB index and an interval not defined by 'system bandwidth/N' are combined with each other, PRBs apart from the starting PRB index as much as the interval can be selected for EPDCCH. In this case, if an index (or position) of a PRB pair constructing a corresponding EPDCCH set exceeds a range of a system bandwidth, a cyclic shift calculation scheme can be applied to the index (or position) of the PRB pair. In this case, as an example, the cyclic shift calculation scheme can be represented by a form of "the total number of PRB pairs constructing PRB pair index (or position) mod system bandwidth".

Similarly, a pattern can be configured by a combination of a random starting PRB index and an interval not defined by 'system bandwidth/N'. And, it is also able to define random patterns and may be then able to assign an index to each of the random patterns.

Configuration of Aggregation Level and its Corresponding Number of Blind Decoding Meanwhile, if N (i.e., the number of PRB pairs) allocated to EPDCCH is small such as a narrowband system, it may be difficult to configure a search space for a high aggregation level (hereinafter abbreviated AL). For instance, when the N is configured by 2, if each PRB pair includes 4 ECCEs, it is impossible to configure a search space for an AL equal to or greater than 8. And, if each PRB pair includes 2 ECCEs, it is impossible to configure a search space for an AL equal to or greater than 4. Hence, in this case, a search space for a corresponding AL can be allocated to a different AL. In particular, the aforementioned method corresponds to a method of enhancing performance while blind decoding complexity (total BD trail number) for an EPDCCH set of a UE is constantly maintained.

Hence, it is able to differently configure the count of performing blind decoding for each AL, i.e., the number of PDCCH candidates according to the number of ECCEs/EPDCCH sets in response to each EPDCCH set allocated to a UE. For instance, if the number of aggregation levels greater than the number of ECCEs within a configured EPDCCH set is configured, it may be able to allocate all ePDCCH candidates for the corresponding ALs to a lowest AL or allocate all ePDCCH candidates for the corresponding ALs to ALs lower than the corresponding AL as fair as possible. For instance, when all PDCCH or ePDCCH candidates (hereinafter abbreviated "candidate") are allocated by {6, 6, 2 and 2} for ALs {1, 2, 4 and 8}, respectively, if N corresponds to 2 and the number of ECCEs per a PRB pair (# of ECCE/EPDCCH set) is configured by 2, the number of ECCEs per an EPDCCH set (# of ECCE/EPDCCH set) becomes 4. Hence, BD on an AL 8 is performed 0 time. Hence, 2 candidates capable of being allocated to the AL 8 can be considered as candidates not allocated from the first (①), all of the 2 candidates are allocated to an AL 1 corresponding to a lowest AL (②) or the 2 candidates are sequentially allocated from a lowest AL to a maximally available AL (③).

TABLE 5

| | | #of BD | | |
|---|---|---|---|---|
| Aggregation level | legacy | ① | ② | ③ |
| 1 | 6 | 6 | 8 | 7 |
| 2 | 6 | 6 | 6 | 7 |
| 4 | 2 | 2 | 2 | 2 |
| 8 | 2 | 0 | 0 | 0 |

The number of candidates for each AL can be delivered to a UE via RRC signaling and the like. In particular, an eNB can configure the number of candidates for each AL together with N while configuring an EPDCCH set. For instance, the eNB can configure the number of BD attempts (# of BD) for each of ALs {1, 2, 4 and 8} as {6, 6, 2 and 2} while configuring one EPDCCH set. In order to reduce signaling overhead, a configurable combination of the # of BD is defined by a finite number in advance and the configurable combination of the # of BD can be configured by an index of the finite number only.

TABLE 6

| index | # of BD for each aggregation level |
|---|---|
| 0 | {6, 6, 2, 2} |
| 1 | {8, 4, 2, 2} |
| 2 | {4, 4, 4, 4} |
| ... | ... |

The AL mentioned earlier in the embodiment above is just an example only. It is apparent that the AL can be configured by a different value via a predetermined rule or a signal. Similarly, the number of BD attempts interlocked (or allocated) to a specific AL mentioned earlier in the foregoing description can also be configured by a different value (e.g., the number of BD attempts for each of AL={1, 2, 4 and 8} can be configured as {6, 6, 2 and 2}, respectively,) (via a predetermined rule or a signal).

In this case, if the number of ECCEs within a configured EPDCCH set is configured to be smaller than a specific AL, exception handling can be performed by a direct method or an indirect method. For instance, in case of using the direct method, an eNB redistributes the number of candidates by selecting an appropriate method and then reconfigures a UE. Or, the eNB can deliver an index corresponding to a new combination to the UE.

In case of using the indirect method, if an exception occurs, a UE performs exception handling according to a predetermined rule. For instance, when an exception occurs between an eNB and a UE, if it is promised to use the scheme of 1 in advance, the UE does not perform blind decoding (BD) on an AL, which is not supported, and follows original configuration as it is for the rest of ALs.

As mentioned in the foregoing description, if the number of ECCEs within a configured EPDCCH set is configured to be smaller than an aggregation level, it is influenced by an N value. Moreover, if the number of ECCE/PRB pair is changed or an AL to be supported is changed, the aforementioned case may occur as well.

For instance, as an example of changing the number of ECCE within a configured EPDCCH set for an identical N, the number of ECCE/PRB pair can be decreased as much as 1/k of a different subframe in such a subframe of a specific type as a special subframe. In this case, if the N is identical to each other, the number of ECCE within a configured EPDCCH set (=the number of ECCE within N PRB pair) is also decreased to 1/k. As a different case, an AL might be changed as well. This corresponds to a case that the number of available REs per PRB pair (# of RE/PRB pair) is decreased to 1/m as other signals such as a CSI-RS and the like are allocated to a corresponding subframe. In this case, an AL to be supported increases as much as m times. The aforementioned description can be summarized as follows.

# of ECCE within N PRB pair<=(or <) AL may occur in the following case.
1) N is decreased->N can be configured to be increased
2) # of eCCE/PRB pair is decreased
3) AL is increased A case of occurring 1) and a method of assigning a new BD attempt number have been explained in the foregoing description. For instance, when 2) occurs, if N corresponds to 2 and the number of ECCE/PRB pair is configured by 4, an AL can be configured up to 8. Yet, if the ECCE/PRB pair is changed to 2, the AL might be configured up to 4. For instance, when 3) occurs, if the # of RE/PRB pair becomes smaller than 104, an AL to be supported might be changed to {2, 4, 8 and 16} from {1, 2, 4 and 8}. This is because, if the number of available REs per a PRB pair is less than 104, it may be difficult to transmit DCI payload using a single ECCE. For instance, a normal subframe including a normal CP is configured by 4 ECCEs per a PRB pair. In this case, if the number of available REs per a PRB pair is less than 104, since one ECCE includes REs less than 26, it may be difficult to load DCI. Hence, in order to transmit DCI, it is necessary to include more ECCEs in EPDCCH in a manner of raising a minimum AL onto one more step. In this case, if N corresponds to 2 and the number of ECCE/PRB pair corresponds to 4, it is unable to configure an AL 16.

In case of 2) and 3), similar to 1), if an AL incapable of being supported occurs, the number of BD attempts (i.e., the number of candidates of EPDCCH) allocated to the corresponding AL can be allocated to a different AL using the ①, ②, or ③ method.

It is able to configure an AL to have a different value as occasion demands. For instance, an AL can be restricted to be equal to or less than 4 for localized transmission only (to make all candidates to be configured in a PRB pair). As mentioned in the foregoing description, if an AL of a range, which is smaller than a predetermined AL combination, is supported only, the number of BD attempts for each AL can be determined in a manner of deducting the number of BD attempts for each AL from the number of BD attempts for a predetermined AL combination using the ①, ② or ③ method.

Blind Decoding (BD) Candidate Assignment for Multiple EPDCCH Sets

Meanwhile, a UE can be configured by two or more EPDCCH sets. In this case, blind decoding (BD) candidates can be divided on the basis of each EPDCCH set. The number of candidates allocated to available ALs of each EPDCCH set can be randomly configured by a network or can be determined by an implicit rule. Yet, the total number of BD candidates should be maintained by a level similar to the number of legacy BD candidates.

In order to allocate the number of BD candidates by an implicit rule, it is necessary to design a rule applicable to the number of configurable random EPDCCH sets, a transmission mode and an available AL combination. As a simple example, it may consider a case that maximum 2 EPDCCH sets are configured and each EPDCCH set identically supports ALs of {1, 2, 4 and 8}. In this case, the number of BD candidates can be determined as follows.

TABLE 7

| AL | Set 1 | Set 2 |
| --- | --- | --- |
| 1(2) | 3 | 3 |
| 2(4) | 3 | 3 |
| 4(8) | 1 | 1 |
| 8(16) | 1 | 1 |

If a specific set is unable to support any AL, as mentioned earlier in the foregoing example, BD capability for an unsupportable AL can be independently distributed to a different AL for each set. Or, it may not perform block decoding on a corresponding AL.

As a different method, the number of BD candidates for each AL can be constantly maintained in all sets. When a specific set is unable to support any AL, if the rest of sets support a corresponding AL, it may be able to make the rest of sets support a BD candidate for the unsupportable AL. If the rest of sets are also unable to support the AL, it may be able to make BD candidate reassignment to be performed in an identical set. In this case, the rest of sets can include a legacy PDCCH. When the number of REs/PRB pair becomes less than $X_{thresh}$ and the AL capable of being supported is changed to {2, 4, 8 and 16}, if the number (N1) of PRB pair of a set 1 corresponds to 2, since it is impossible to configure an AL 16 in the set 1, two candidates can be allocated to an AL 16 of a set 2. If the number (N2) of PRB pair of the set 2 is not sufficient enough to support the candidates (e.g., N2=4), the corresponding BD candidate can be allocated to an AL 2 and the like.

TABLE 8

|  | Set 1 (N1 = 2) | Set 2 (N2 = 8) |
| --- | --- | --- |
| 2 | 3 | 3 |
| 4 | 3 | 3 |
| 8 | 1 | 1 |
| 16 | 0 | 2 |

TABLE 9

|  | Set 1 (N1 = 2) | Set 2 (N2 = 4) |
| --- | --- | --- |
| 2 | 3 | 4 |
| 4 | 3 | 3 |

TABLE 9-continued

| | Set 1 (N1 = 2) | Set 2 (N2 = 4) |
|---|---|---|
| 8 | 1 | 1 |
| 16 | 0 | 1 |

Meanwhile, it may be able to define a primary set including N of a prescribed level or higher and a secondary set including no specific restriction on N in a configurable range. The level of the N of the primary set uses a predetermined value and can be configured to have a minimum N value capable of supporting a maximum AL in a random configuration. For instance, if there exists a maximum N value when the number of ECCEs/PRB pair corresponds to 4 and a maximum AL corresponds to 16 or when the number of ECCEs/PRB pair corresponds to 2 and a maximum AL corresponds to 8, the minimum N value of the primary set becomes 4. In this case, if it is impossible to configure a candidate for the maximum AL to be greater than a predetermined number (occurrence of a candidate mapped to an identical ECCE), the N value should be configured in consideration of the number of minimum candidates as well. For instance, if the N corresponds to 4, one candidate can be configured only for an AL 8. Hence, if two or more candidates are allocated for the AL 8, the N of the primary set should be configured by a value equal to or greater than 8.

Since the primary set assures a maximum AL, ALs are classified into "high" and "low". ALs belonging to the "high" can be assigned to the primary set and ALs belonging to the "low" can be assigned to the secondary set. As an absolute method of classifying ALs into the "high" and the "low", there may exist a method of configuring an AL equal to or higher than a random AL (e.g., an AL equal to or higher than 4) as the "high". Or, as a relative method of classifying ALs into the "high" and the "low", there may exist a method of determining an AL in consideration of a level of the AL in all configurable ALs. For instance, when ALs 1, 2, 4 and 8 are supported, 1 and 2 can be classified into the "low" and 4 and 8 can be classified into the "high". If the number of REs/PRB pair is less than $X_{thresh}$ and an AL is changed to {2, 4, 8 and 16}, 2 and 4 can be classified into the "low" and 8 and 16 can be classified into the "high". When the aforementioned method is used, a BD candidate is allocated as follows.

TABLE 10

| AL | Primary set (N1 = 8) | Secondary set (N2 = 2) |
|---|---|---|
| 1(2) | 0 | 6 |
| 2(4) | 0 | 6 |
| 4(8) | 2 | 0 |
| 8(16) | 2 | 0 |

In case of the secondary set, when it is impossible to configure a specific AL due to the deficiency of available resource in a configured N, it is able to make a candidate for the corresponding AL to be allocated in the primary set only. For instance, when N2 of the secondary set is configured by 2, if the number of REs/PRB pair is less than $X_{thresh}$ and the AL is changed to {2, 4, 8 and 16} from {1, 2, 4 and 8}, it is impossible to configure a candidate including an AL 16 in the secondary set. In this case, all candidates corresponding to the AL 16 are allocated to the primary set.

TABLE 11

| AL | Primary set (N1 = 8) | Secondary set (N2 = 2) |
|---|---|---|
| 2 | 3 | 3 |
| 4 | 3 | 3 |
| 8 | 1 | 1 |
| 16 | 2 | 0 |

The aforementioned method can be identically applied to a case that ALs are classified into a "high" and a "low" and "low" ALs are assigned to the secondary set only. Although the "low" ALs are assigned to the secondary set only, if too small N is configured or the # of ECCE/PRB pair is decreased due to a change of a subframe type, it may be necessary to have a bigger N for an identical AL. (Similarly, if an AL increases due to the decrease of the # of RE/PRB pair and the like, it may be necessary to have a bigger N for an identical DCI transmission.)

The aforementioned method can be performed by an implicit rule. If an AL for each EPDCCH set and the number of BD candidates corresponding to each AL are predefined, the method can be applied when random EPDCCH sets are assigned. As a different method, a network can signal to a UE for the number of BD candidates in a manner of assigning the number of BD candidates to each EPDCCH set. In this case, the network can allocate a BD candidate to an AL of each set using the identical method.

When the network configures the number of BD candidates, as an extreme example, the network may consider a random combination of full flexibility while putting a restriction (level similar to a legacy) on the total number of BD candidates only. Yet, in this case, considerable amount of signaling overhead may occur. Hence, it is preferable to calculate the number of BD candidates via an implicit rule. If a specific AL is unable to be configured in an identical N due to a change of a subframe type and the like, it is able to make the aforementioned exception handling to be determined by the implicit rule at least.

Exception handling for a case that the # of ECCE within a configured EPDCCH set becomes smaller than an AL has been explained in the foregoing description. In particular, this indicates that the number of candidates capable of being configured by a specific AL is restrictive in case of assigning the number of BD candidates to each AL. When it is impossible to configure candidates to a corresponding AL as many as the number of BD candidates specified in advance, the rest of BD candidates are assigned to a different AL. In this case, the number of remaining candidates can be reassigned in a manner of filling the remaining candidates into a highest AL first among ALs equal to or lower than the corresponding AL. In particular, surplus BD candidates remained after being assigned to the maximum AL among the ALs equal to or lower than the corresponding AL are firstly assigned to a next high AL. The aforementioned process is repeated until a smallest AL or can be repeatedly performed until a predetermined minimum AL. If there is a remaining BD candidate after the BD candidates are assigned to the minimum AL in a corresponding set, the remaining BD candidate is not assigned or can be assigned to a different set.

As mentioned in the foregoing description, a high AL has priority for BD candidate assignment. It may indicate that a candidate can be secured for a case of transmitting DCI using the high AL. In particular, when the number of ECCEs constructing EPDCCH has a restriction on configuring a relatively high AL, if the corresponding candidate is reassigned to an AL corresponding to a next high AL, it may have fairness with a relatively low AL. As an example, when a high AL is required in a bad channel environment, assigning an additional candidate to a low AL, which has already secured sufficient candidates, may be meaningless.

As an example, when there is a reference AL L in a given situation, one embodiment of the aforementioned principle is explained under an assumption that the number {6, 6, 2 and 2} of candidates are assigned to an AL L, 2L, 4L and 8L, respectively. In this case, if 8 PRB pairs are given, assume that total 32 ECCEs are generated, the reference AL corresponds to 4 and an AL 32 does not exist due to excessive resource consumption. First of all, 2 candidates for an AL 32 corresponding to the 8L can be assigned to a different AL and it may be able to attempt to assign the candidates to an AL 16 corresponding to a biggest AL among ALs smaller than the AL 32. Since two candidates existing in the AL 16 are consuming all 32 ECCEs, it is unable to assign an additional candidate to the AL 16. Hence, it may be able to attempt to assign candidates to the AL 8 corresponding to a next AL. Since total 4 candidates can be made by 32 ECCEs, two candidates are remained again among 6 candidates assigned to the AL 8. Hence, it may be able to attempt to assign total 4 remaining candidates to the AL 4. Since total 8 candidates can exist in the AL 4, 2 remaining candidates are assigned to the AL 4 and another 2 remaining candidates are assigned to the AL 2. As a result, the {0, 2, 8, 4, and 2} number of candidates are assigned to the AL 1, 2, 4, 8, and 16, respectively.

Table in the following shows a case of assigning BD candidates in accordance with each situation based on the aforementioned principle. In this case, if a reference level corresponds to 4, it is assumed that there is no EPDCCH set configured by 2 PRB pairs. If a reference level corresponds to 4, it is assume that there is no AL 1.

TABLE 12

|  | Reference level 1 | Reference level 2 | Reference level 4 |
|---|---|---|---|
| 2 PRB pairs | {8, 4, 2, 1, 0} | {0, 4, 2, 1, 0} | — |
| 4 PRB pairs | {6, 6, 2, 2, 0} | {0, 8, 4, 2, 1} | {0, 8, 4, 2, 1} |
| 8 PRB pairs | {6, 6, 2, 2, 0} | {0, 6, 6, 2, 2} | {0, 2, 8, 4, 2} |

Table in the following shows an example of actually assigning BD candidates to two EPDCCH sets based on a reference applied to the aforementioned embodiment. In this case, N1 and N2 indicate the number of PRB pairs of an EPDCCH set 1 and the number of PRB pairs of an EPDCCH set 2, respectively. A BW indicates a bandwidth and a Min AL indicates a minimum AL capable of being transmitted in a given subframe. As mentioned in the foregoing description, the Min AL changes when the number of available REs per a PRB pair is relatively small and the like. For instance, if the number of available REs per a PRB pair is less than 104, the Min AL can be changed to 2. A reference level applied to Table in the following is assumed as follows.

Reference Level 4

In case of using a DCI format 2 when Min AL corresponds to 2 in a situation that BW is greater than 25*RBs Reference Level 2

In case of using a DCI format 0/1 when Min AL corresponds to 2 in a situation that BW is greater than 25*RBs In case of using a DCI format 2 when Min AL corresponds to 1 in a situation that BW is greater than 25*RBs In case of using a DCI format 0/1 when Min AL corresponds to 2 in a situation that BW is equal to or smaller than 25*RBs In case of using a DCI format 2 when Min AL corresponds to 2 in a situation that BW is equal to or smaller than 25*RBs Reference Level 1

Other Case

In this case, assume that BD candidates are identically assigned to each EPDCCH set. In particular, basically, the {3, 3, 1 and 1} number of candidates are assigned to AL L, 2L, 4L and 8L, respectively.

TABLE 13

| BW | N1 | N2 | Min AL = 1 DCI format 0/1/1A/... | Min AL = 1 DCI format 2/2B/2C/2D... | Min AL = 2 DCI format 0/1/1A/... | Min AL = 2 DCI format 2/2B/2C/2D... |
|---|---|---|---|---|---|---|
| <=25 RB | 2 | 0 | {8, 4, 2, 1, 0}, {0, 0, 0, 0, 0} | {8, 4, 2, 1, 0}, {0, 0, 0, 0, 0} | {0, 4, 2, 1, 0}, {0, 0, 0, 0, 0} | {0, 4, 2, 1, 0}, {0, 0, 0, 0, 0} |
| <=25 RB | 2 | 2 | {3, 3, 1, 1, 0}, {3, 3, 1, 1, 0} | {3, 3, 1, 1, 0}, {3, 3, 1, 1, 0} | {0, 4, 2, 1, 0}, {0, 4, 2, 1, 0} | {0, 4, 2, 1, 0}, {0, 4, 2, 1, 0} |
| <=25 RB | 4 | 0 | {6, 6, 2, 2, 0}, {0, 0, 0, 0, 0} | {6, 6, 2, 2, 0}, {0, 0, 0, 0, 0} | {0, 8, 4, 2, 1}, {0, 0, 0, 0, 0} | {0, 8, 4, 2, 1}, {0, 0, 0, 0, 0} |
| <=25 RB | 4 | 2 | {3, 3, 1, 1, 0}, {3, 3, 1, 1, 0} | {3, 3, 1, 1, 0}, {3, 3, 1, 1, 0} | {0, 3, 3, 1, 1}, {0, 4, 2, 1, 0} | {0, 3, 3, 1, 1}, {0, 4, 2, 1, 0} |
| <=25 RB | 4 | 4 | {3, 3, 1, 1, 0}, {3, 3, 1, 1, 0} | {3, 3, 1, 1, 0}, {3, 3, 1, 1, 0} | {0, 3, 3, 1, 1}, {0, 3, 3, 1, 1} | {0, 3, 3, 1, 1}, {0, 3, 3, 1, 1} |
| >25 RB | 4 | 0 | {6, 6, 2, 2, 0}, {0, 0, 0, 0, 0} | {0, 8, 4, 2, 1}, {0, 0, 0, 0, 0} | {0, 8, 4, 2, 1}, {0, 0, 0, 0, 0} | {0, 8, 4, 2, 1}, {0, 0, 0, 0, 0} |
| >25 RB | 4 | 4 | {3, 3, 1, 1, 0}, {3, 3, 1, 1, 0} | {0, 3, 3, 1, 1}, {0, 3, 3, 1, 1} | {0, 3, 3, 1, 1}, {0, 3, 3, 1, 1} | {0, 1, 4, 2, 1}, {0, 1, 4, 2, 1} |
| >25 RB | 8 | 0 | {6, 6, 2, 2, 0}, {0, 0, 0, 0, 0} | {0, 6, 6, 2, 2}, {0, 0, 0, 0, 0} | {0, 6, 6, 2, 2}, {0, 0, 0, 0, 0} | {0, 2, 8, 4, 2}, {0, 0, 0, 0, 0} |
| >25 RB | 8 | 4 | {3, 3, 1, 1, 0}, {3, 3, 1, 1, 0} | {0, 3, 3, 1, 1}, {0, 3, 3, 1, 1} | {0, 3, 3, 1, 1}, {0, 3, 3, 1, 1} | {0, 0, 3, 3, 2}, {0, 1, 4, 2, 1} |

The reference level L is not mandatorily to be restricted by a value shown in the example above. And, the reference level L is not mandatorily to be fixed by a value shown in the example above. In particular, the reference level L can be configured by a value instead of 1, 2 or 4 as occasion demands. Moreover, it may be able to configure a different L value for a condition identical to the Table in a manner of additionally considering a transmission mode (localized or distributed) of EPDCCH and other characteristics of EPDCCH.

Meanwhile, when a configuration is made via comparison with a specific threshold in embodiments related to the present invention, it is apparent to those skilled in the art that an expression of including the specific threshold ("equal to or less than the threshold" or "equal to or greater than the threshold) or an expression of not including the threshold ("less than the threshold" or "greater than the threshold") can be changed to an expression of including the threshold or an expression of not including the threshold.

Meanwhile, it is able to differently configure a reference level L according to each EPDCCH set. For instance, in such a scenario as DPS, each EPDCCH set can be transmitted from TPs different from each other. In this case, if a TP 1 uses a 2 port-CRS and a TP 2 uses a 4 port-CRS, the number of available REs of an EPDCCH set 1 transmitted by the TP 1 in a single PRB pair is greater than $X_{thresh}$. On the contrary, the number of available REs of an EPDCCH set 2 transmitted by the TP 2 may be less than the $X_{thresh}$. Hence, in this case, the reference level L is configured by L1=1 for the EPDCCH set 1, whereas the reference level L is configured by L2=2 for the EPDCCH set 2.

As mentioned in the foregoing description, if the reference level L is different from each other according to an EPDCCH set, 2 step approach in the following can be used to split BD candidates for each set.

Step 1: assume a reference level L of each EPDCCH set is identical to each other and performs BD candidates split In particular, when L1 of an EPDCCH set 1 corresponds to 1 and L2 of an EPDCCH set 2 corresponds to 2, BD candidates can be split into each other by assuming L of both sets as either 1 or 2. For instance, if the set 1 and the set 2 are configured by N1=4, L1=1 and N2=8, L2=2, respectively, BD candidates can be assigned as follows.

Set 1: # of BD candidate={3, 3, 1, 1, 0} for L=1, N1=4, aggregation level {1, 2, 4, 8, 16}

Set 2: # of BD candidate={3, 3, 1, 1, 0} for L=1, N2=8, aggregation level {1, 2, 4, 8, 16}

Step 2: Correction is performed for a different L. In the step 1, if L corresponds to L1 (i.e., although L1 is different from L2, L1 is configured as a reference level in the step 1), it is necessary to correct an AL of BD candidates for EPDCCH set including L2, i.e., EPDCCH set 2. After the AL is corrected, if BD candidates assigned to a maximum AL are not wholly supported, the unsupportable surplus BD candidates are reassigned to a different AL. In order to reassign the surplus BD candidates, it may use one of the aforementioned methods to reassign the surplus BD candidates. If correction is performed on the BD assignment for the set 2, it may be represented as follows.

Set 1: # of BD candidate={3, 3, 3, 1, 0} for L1=1, N1=4, aggregation level {1, 2, 4, 8, 16}

Set 2: # of BD candidate={0, 3, 3, 1, 1} for L2=2, N2=8, aggregation level {1, 2, 4, 8, 16}

In this case, it is not important which EPDCCH set is indicated as a reference L among a plurality of EPDCCH sets and which EPDCCH set is corrected in the step 2. In particular, according to the aforementioned example, although the step 1 is performed for EPDCCH set 1 and L=1 and the correction is performed on the EPDCCH set 2, i.e., L2=2 in the second step, it is not mandatory.

For instance, the aforementioned process can be performed on the basis of an EPDCCH set transmitted by a serving cell. When the EPDCCH set transmitted by the serving cell corresponds to a set 1 and a reference level L1 corresponds to 2, if a reference level L2 of EPDCCH set 2 transmitted by a different TP corresponds to 1, the step 1 is performed for the reference level 2 and correction can be performed on the EPDCCH set 2 in the second step. In an identical situation, the aforementioned process can be performed on the basis of a minimum L. In this case, it may be able to make the reference level L2=1 of the EPDCCH set 2 transmitted by the TP 2 to be a reference of the step 1 to assume L=1 and may be then able to perform correction on BD assignment for the EPDCCH set 1 in the second step.

Meanwhile, when BD candidates are assigned to two or more EPDCCH sets, the number of candidates assigned to each set can be differently assigned according to each set. As a method of differently assigning the number of candidates according to each set, the number of candidates according to each set can be defined by a function for N and L. As an example, if N/L becomes a reference of BD split, it may be able to reflect the number of available REs. In this case, if N is different from each other for an identical L, the number of BDs may vary according to a set. If L is different from each other for an identical N, the number of BDs may vary according to a set. On the contrary, although N and L are different from each other between sets, if N/L is identical to each other, the identical number of BDs can be assigned.

Hence, as a method of considering N/L when BD candidates are split according to a set, it is able to make the number of BD candidates according to each set to be in proportion to N/L value of each set. In this case, if N/L is identical to each other between sets, BD candidates can be uniformly divided between sets.

For instance, if the set 1 and the set 2 are configured by N1, L1=4, 1 and N2, L2=8, 2, respectively, BD candidates can be assigned as follows.

Set 1: # of BD candidate={3, 3, 1, 1, 0} for L1=1, N1=4, N1/L1=4, aggregation level {1, 2, 4, 8, 16}

Set 2: # of BD candidate={0, 3, 3, 1, 1} for L2=2, N2=8, N2/L2=4, aggregation level {1, 2, 4, 8, 16}

In particular, since N1/L1=4 of the set 1 and N2/L2=4 of the set 2 are identical to each other, each set has candidates of an identical number. And, {3, 3, 1, 1, 0} is assigned to the EPDCCH set 1 and {0, 3, 3, 1, 1} is assigned to the EPDCCH set 2 after correction on BD candidate assignment is performed.

For instance, if the set 1 and the set 2 are configured by N1=4, L1=1 and N2=8, L2=1, respectively, BD candidates can be assigned as follows. In this case, the number of BD candidates for each AL is divided by the N1/L1 to N2/L2 ratio. If the ratio is not an integer, the ratio is processed by a round function.

Set 1: # of BD candidate={2, 2, 1, 1, 0} for L1=1, N1=4, N1/L1=4, aggregation level {1, 2, 4, 8, 16}

Set 2: # of BD candidate={4, 4, 1, 1, 0} for L2=1, N2=8, N2/L2=8, aggregation level {1, 2, 4, 8, 16}

In particular, when N1/L1 of the set 1 corresponds to 4 and N2/L2 of the set 2 corresponds to 8, since the ratio of N1/L1:N2/L2 corresponds to 1:2, the number of BD candidates assigned to the set 2 can be greater than the number of BD candidates assigned to the set 1 as much as twice.

When the set 1 and the set 2 are configured by N1=4, L1=1 and N2=8, L2=2, respectively, BD candidates can be assigned as follows in consideration of N/L of the step 1 of the 2 step approach.

Step 1: assume L=L1=L2=1 for two sets and BD candidates are split between sets on the basis of N/L
  Set 1: # of BD candidate={2, 2, 1, 1, 0} for L1=1, N1=4, aggregation level {1, 2, 4, 8, 16}
  Set 2: # of BD candidate={4, 4, 1, 1, 0} for L2=1, N2=8, aggregation level {1, 2, 4, 8, 16}
Step 2: correction on set 2
  Set 1: # of BD candidate={2, 2, 1, 1, 0} for L1=1, N1=4, aggregation level {1, 2, 4, 8, 16}
  Set 2: # of BD candidate={0, 4, 4, 1, 1} for L2=2, N2=8, aggregation level {1, 2, 4, 8, 16}

Meanwhile, an AL (aggregation level) of EPDCCH and BD candidate for each AL can be influenced by a bandwidth of a scheduling cell and a bandwidth of a scheduled cell. An AL may have a different configuration according to a system bandwidth. For instance, if a system bandwidth is equal to or greater than a predetermined specific threshold value, a minimum AL is defined by 2. On the contrary, if the system bandwidth is less than the threshold value, the minimum AL is defined by 1. Hence, when the scheduling cell and the scheduled cell have a bandwidth to which a minimum AL, which is different from each other on the basis of a threshold value, is set, if CCS (cross carrier scheduling) is performed, a configuration problem of an AL of EPDCCH and a configuration problem of BD candidate for each AL occur.

Determination of AL of EPDCCH and BD Candidates in Case of Performing CCS

In case of performing CCS (cross carrier scheduling), an AL of EPDCCH and BD candidate for each AL can be determined by a method in the following.

Method 1

First of all, it may be able to follow an AL which is determined on the basis of a bandwidth among a bandwidth of a scheduling cell and a bandwidth of a scheduled cell. In particular, if the bandwidth of the scheduling cell is less than a threshold value and the bandwidth of the scheduled cell is greater than the threshold value, an SS including a minimum AL (=1) can be configured on the basis of the scheduling cell. Or, an SS including a minimum AL (=2) can be configured on the basis of the scheduled cell. If the bandwidth of each cell has an opposite configuration, the minimum AL has an opposite configuration as well.

As an example, in case of performing single carrier scheduling, for DCI format 2/2C, assume that an AL and the number of BD candidates are determined as follows.

If a system bandwidth is less than a specific threshold value, # of BD candidates={6, 6, 2, 2, 0} for AL={1, 2, 4, 8, 16}
If a system bandwidth is greater than a specific threshold value, # of BD candidates={0, 6, 6, 2, 2} for AL={1, 2, 4, 8, 16}

In this case, when cross carrier scheduling is performed, if a bandwidth of a scheduling cell and a bandwidth of a scheduled cell are identical to each other, an AL and the number of BD candidates for each AL can be calculated by simple sum.

For instance, both the bandwidth of the scheduling cell and the bandwidth of the scheduled cell are less than a threshold value, the # of BD candidates becomes {12, 12, 4, 4, 0} for AL={1, 2, 4, 8, 16}.

In this case, if the bandwidth of the scheduling cell and the bandwidth of the scheduled cell are different from each other, one of the bandwidths becomes a reference. For instance, when the bandwidth of the scheduling cell is less than the threshold value and the bandwidth of the scheduled cell is greater than the threshold value, if the bandwidth of the scheduling cell becomes a reference, the number of BD candidates becomes {12, 12, 4, 4, 0} for AL={1, 2, 4, 8, 16}. On the contrary, if the bandwidth of the scheduled cell becomes a reference, the number of BD candidates becomes {0, 12, 12, 4, 4} for AL={1, 2, 4, 8, 16}.

Method 2

As a different method, an AL can be determined in consideration of both a bandwidth of a scheduling cell and a bandwidth of a scheduled cell.

In particular, if the bandwidth of the scheduling cell and the bandwidth of the scheduled cell are different from each other, an AL can be determined by appropriately combining an AL assigned to each CC by single carrier scheduling and the number of BD candidates for each AL with each other. As an example of the method of combining, it may be able to add up the number of BD candidates for each AL. For instance, in the example, if the bandwidth of the scheduling cell is less than a threshold value and the bandwidth of the scheduled cell is greater than the threshold value, the number of BD candidates can be determined as {6, 6, 2, 2, 0}+{0, 6, 6, 2, 2}={6, 12, 8, 4, 2} for AL={1, 2, 4, 8, 16}. In this case, if the bandwidth of the scheduling cell and the bandwidth of the scheduled cell are identical to each other, it may be able to have an AL and the number of BD candidates identical to a value determined based on one bandwidth among the bandwidth of the scheduling cell and the bandwidth of the scheduled cell.

As a further different embodiment, a configuration of an AL finally derived by the proposed scheme and the number of BD candidates for the AL are used as an input factor of a predetermined equation defining a search space. In this case, as an example, a search space for a scheduling cell and a scheduled cell can exist in a plurality of EPDCCH sets or a specific EPDCCH set defined in the scheduling cell via the equation defining the SS in environment to which a CCS technique is applied. As an embodiment, the equation defining the SS can be defined as follows.

$$L\left\{\left(Y_{p,k} + \left\lfloor \frac{m' \cdot N_{ECCE,p,k}}{L \cdot M_p^{(L)}} \right\rfloor \right) \mod \lfloor N_{ECCE,p,k}/L \rfloor \right\} + i \qquad \text{[Equation 1]}$$

In this case, L indicates an aggregation level (AL) defined for a specific EPDCCH set, $M_p^{(L)}$ indicates the number of BD candidates for an AL (=L) of a specific EPDCCH set # p, $N_{ECCE,p,k}$ indicates the total number of ECCEs capable of being derived from the specific EPDCCH set # p at a timing of subframe # k, $Y_{p,k}$ indicates a pseudo-random variable defined for the specific EPDCCH set # p at a timing of subframe # k, and the parameter (i.e., $Y_{p,k}$) can be randomized by C-RNTI and/or a slot index and/or a random seed value (i.e., A) and/or an EPDCCH set index etc. In addition, the rest of variables of the equation are defined as i=0, . . . , L−1 m'=m+$M_p^{(L)} \cdot n_{CI}$ (Yet, if a CIF field-based control information reception operation is not performed, it may be defined as m'=m. In this case, $n_{CI}$ indicates a value of a CIF field and is defined as m=0,1, . . . $M_p^{(L)}$−1).

As an embodiment, a configuration of an AL finally calculated by the proposed scheme and the number of BD candidates for the AL can be respectively applied to the L value of the equation defining the SS and the $M_p^{(L)}$ as an input factor. By doing so, a final search space for the scheduling cell and the scheduled cell on which CCS is performed can be implemented in a plurality of EPDCCH sets or a specific EPDCCH set defined in the scheduling cell.

The aforementioned proposed scheme can be applied to a specific element or a specific form of the specific element only among such various elements capable of influencing on an AL and BD candidates assigned to each AL as a DCI format, a transmission mode and the number of available REs. For instance, the proposed scheme can be applied to the DCI format only. Or, the proposed scheme may not be applied to DCI format 0/1A while being applied to DCI format 2/2C. If BD candidate configuration assigned using the proposed scheme is unable to be supported in a specific EPDCCH configuration (e.g., in case of having the number of available REs incapable of supporting a high AL etc.), it may be able to apply a scheme of assigning surplus BD candidates for a specific AL to a different AL or a different EPDCCH set proposed by a different embodiment as it is.

In case of performing CCS (cross carrier scheduling) according to a different embodiment of the present invention, a method of configuring an SS according to whether the number of BD candidates is increased by comparing with a non-CA is explained in the following.

A. The Number of Candidates of AL L Increases in EPDCCH Set p when CCS is Performed (i.e., in Case of Making a Big SS Integrating SSs of Each CC with Each Other)

According to the scheme mentioned earlier in the foregoing description, in case of performing CCS (cross carrier scheduling), BD candidates for each CC are aggregated with each other to determine the number of candidates according to each AL and then a search space is configured. According to an example of the proposed scheme, when the number of BD corresponds to {x1, x2, x3, . . . } on the basis of a CC 0 and the number of BD corresponds to {y1, y2, y3, . . . } on the basis of a CC 1 for AL={L1, L2, L3, . . . }, if blind decoding is performed on the BD candidates when CCS is performed, the number of BD candidates allocated to each AL can be determined by a union of the candidates of each CC. In particular, the number of BD corresponds to x1+y1, x2+y2, x3+y3, . . . for the AL L1, L2, L3, . . . . Hence, when a search space is configured, it may use L=L1, L2, L3, . . . , $M_p^{(L)}$=x1+y1, x2+y2, x3+y3, . . . (the number of BD candidates in AL L) and $M_p^{(L)}$−1 in the aforementioned equation defining the SS.

In this case, in determining the total number of BD candidates, instead of adding up the number of candidates according to each AL for each CC, the number of candidates according to each AL can be multiplied by a number as many as the number of cells on the basis of a random CC. This scheme can be identically applied to the aforementioned different schemes as well.

In this case, for instance, if the number of BD candidates of CC2 becomes a reference, it may use $M_p^{(L)}$=y1*2, y2*2, y3*2, . . . , L=L1, L2, L3, . . . , m'=0,1, . . . $M_p^{(L)}$−1 in the aforementioned equation. In this case, in order to determine a reference CC, it may be able to select a CC including a minimum (or maximum) CIF value or a CC including the maximum (or minimum) number of candidates.

A-1. Determination of Candidate Position of Each CC in SS

A-1-1. Sequential Scheme According to CC

In this case, a position of a candidate for each CC among the $M_p^{(L)}$ number of candidates in AL=L can be differently determined in $N_{ECCE,p,k}$. For instance, if candidates of each CC are sequentially positioned, among the $M_p^{(L)}$=x1+y1 number of candidates, the x1 number of indexes correspond to candidates of a CC 0 and the y1 number of indexes correspond to candidates of a CC 1 when L corresponds to 1.

An SS at which candidates of each CC are sequentially positioned can be defined as follows. An $m^{th}$ candidate of a CC corresponding to $n_{CI}$=n is mapped to $$m' = m + \sum_k M_{p,k}^{(L)} I(k, n)_{th}$$

candidate. In this case, I (k, n) corresponds to a function indicating 1 when a cell ($n_{CI}$=k) where k<n is scheduled by a cell identical to a cell ($n_{CI}$=n). Otherwise, the function indicates 0. If $n_{CI}$ corresponds to indexes of the N number of CCs used for cross carrier scheduling from 0 to N−1, the aforementioned equation can also be represented as $$m' = m + \sum_{k<n} M_{p,k}^{(L)}.$$

$M_{p,n}^{(L)}$ corresponds to the number of candidates in EPDCCH set p, $n_{CI}$=n and AL=L. Hence, for instance, if a CC 0 and a CC1 have the x1 number of candidates and the y1 number of candidates, respectively, in L=1, positions of the total x1+y1 number of candidates are generated. The candidates of the CC 0 are positioned at m'=0, 1, 2, . . . , (x1−1) and the candidates of the CC 1 are positioned at m'=x1, . . . , (x1+y1−1). A CC n indicates a CC where $n_{CI}$ corresponds to n.

A-1-2. Alternate Scheme According to CC

On the contrary, candidates of CCs different from each other can be positioned as alternate as possible. This scheme can reduce a localizing problem of candidates of a specific CC that occupies a physically adjacent ECCE. For instance, when L corresponds to 1, the y1/x1 number of CC 1 candidates can be positioned immediately after a candidate of a CC 0 (y1>=x1). This scheme can be identically applied to a different AL as well. As a different simple scheme, it may be able to alternately position candidates of each CC one at a time and the remaining candidates of a next specific CC can be contiguously positioned. Or, if an AL has the number of candidates different from each other between CCs, it may be able to promise not to define an SS.

An SS at which candidates of each CC are alternately positioned by 1 can be generated in a manner of being defined by m'=m·N+$n_{CI}$. In this case, N corresponds to the number of cells receiving (i.e., cross-carrier scheduled in an identical cell) a scheduling message via a corresponding cell and $n_{CI}$ corresponds to a CC index value. If the number of candidates of each CC is different from each other, similar to a case that the number of candidates of each CC is identical to each other, it may be able to apply m'=m·N+$n_{CI}$. Yet, in this case, virtual candidate positions are generated as many as a number resulted from multiplying the number of candidates of a CC including a maximum candidate in AL=L by the number of scheduled cells and then an actual candidate can be allocated. Hence, it may be able to represented as $M_p^{(L)}$=N*max($M_{p,n}^{(L)}$). For instance, if x1 is greater than y1 in L=1, the 2*x1 number of virtual candidates are generated. If the x1 number of candidates of the CC 0 and the y1 number of candidates of the CC 1 are allocated, the candidates of the CC 0 are positioned at m'=0, 2, 4, 8, . . . , 2*(x1−1) and the candidates of the CC 1 are positioned at m'=1, 3, 5, 7, . . . , 2*(y1−1)+1. BD is not performed in positions of the remaining 2*(x1−1)−{2*(y1−1)+1} number of candidates. This is because there is no valid candidate in the corresponding positions.

$n_{CI}$ of the equation, i.e., a CC index value may use a CIF value. Yet, in case of carrier aggregating CCs including a CIF 3 and a CIF 5 with each other, it is unable to use a CIF value as it is. Hence, for this reason, there exists a newly defined CC index. Hence, the $n_{CI}$ is determined in a manner that CCs used for cross carrier scheduling are arranged according to a specific criterion and an index increasing by 1 from 0 is provided. CCs can be arranged by an ascending order or a descending order according to a CIF value. When the CCs are arranged by the ascending order, if CCs including the CIF 3 and the CIF 5 are aggregated with each other, a CC of the CIF 3 and a CC of the CIF are indexed by $n_{CI}$=0 and $n_{CI}$=1, respectively. The CCs can be newly indexed in a manner of being arranged by the ascending order or the descending order on the basis of the number of BD candidates according to each AL instead of the CIF value.

As a further different embodiment of the present invention, when the number of candidates of each CC are different from each other, in order to distribute the candidates as uniformly as possible, it may be able to make positions of the candidates alternately have an index according to a CC as many as a number in proportion to the number of candidates of each CC divided by the number of candidates of total CCs. In particular, when a CC 0 has the x1 number of candidates and a CC 1 has the y1 number of candidates, if x1 is equal to or greater than y1, a candidate of the CC 0 appears x1/y1 times and then a candidate of the y1 appears one time. In this case, a candidate m of the CC 0 uses m'=m+floor (m*y1/x1) and a candidate m of the CC 1 can be defined by m'=m+floor (m*x1/y1)+ceiling(x1/y1). In case of the CC 0, this equation increases m' by 1 whenever m increases by 1 and puts a gap as much as a floor function value to make the candidate of the CC 1 appear once at y1/x1 times of the candidate of the CC 0. An identical principle is also applied to the CC 1. Yet, an offset as much as a ceiling function is put to enable the CC 0 to use until a first gap for the CC 1 appears from m'=0. In this case, the floor (.) function corresponds to a function returning a biggest integer among integers equal to or less than "." and the ceiling (.) function corresponds to a function returning a smallest integer among integers equal to or greater than ".".

Meanwhile, when the aforementioned equation is applied, it is necessary to newly perform CC indexing to make x1 to be always equal to or greater than y1. In particular, when an AL corresponds to L, it may be able to make the number of candidates of the CC 0, i.e., x1, always have a value greater than the number of candidates of the CC 1, i.e., y1, in a manner of configuring a CC always including the greater number of candidates as the CC 0 and configuring a CC including the less number of candidates as the CC 1. When the number of candidates according to a CC is identical to each other, indexing can be performed irrespective of the number of candidates.

Meanwhile, $M_p^{(L)}$ can be determined to be the number of BD candidates of a specific CC (i.e., $n_{CI}$=n*) using such a scheme as $M_p^{(L)}=M_{p,n^*}^{(L)}$. In this case, the number of BD candidates of a CC to be used can be determined by a method of selecting a CC including the maximum or minimum candidate numbers $$\left(n^* = \max_n(M_{p,n}^{(L)}),\ n^* = \min_n(M_{p,n}^{(L)})\right),$$

a method of selecting a CC (scheduling cell) including a lowest CIF value or a CC index (n*=min($n_{CI}$)), a method of selecting a CC including a maximum CIF or a CC index (n*=max($n_{CI}$)), a method of selecting a CC including a predetermined random CIF value and the like.

B. The Number of Candidates of AL L does not Increase in EPDCCH Set p when CCS is Performed (i.e., in Case of Forming an SS of Each CC as a Non-CA and Overlapping the SS with Each Other)

As a different embodiment of the present invention, in configuring an SS, when there exist two or more BD candidate sets, an SS can be configured for each of the two or more candidate sets and corresponding SSs can be aggregated with each other. For instance, while using the equation 1, an SS 1 for a set 1 is configured using L=L1, L2, L3, . . . , $M_p^{(L)}$=x1, x2, x3, . . . (the number of BD candidates of a set 1 in AL L), m'=0,1, . . . $M_p^{(L)}$−1 and an SS 2 for a set 2 can be configured using $M_p^{(L)}$=y1, y2, y3, . . . (the number of BD candidates of a set 2 in AL L), m'=0,1, . . . $M_p^{(L)}$−1 in response to the identical L=L1, L2, L3, . . . A union of the configured SSs can complete a whole SS.

In this case, since a candidate position for each CC is defined as m'=m in the equation for each SS, a problem of determining a candidate position according to a CC does not occur. In aggregating SSs with each other, in order to mitigate a problem of collision between candidate positions, an offset different from each other can be assigned to an SS different from each other. Simply, a CC index value and the like can be used as the offset.

Meanwhile, in this case, $M_p^{(L)}$ can also be determined using such a scheme as $M_p^{(L)}=M_{p,n^*}^{(L)}$ for each n and L. In particular, the number of BD candidates of a specific CC n* can be used as $M_p^{(L)}$ value applied to all n. For instance, when a maximum value or a minimum value of the number of candidates allocated to a corresponding AL L is configured among the number of BD candidates of each CC, it may become $M_p^{(L)}$=max(x1, y1), max(x2, y2), max(x3, y3), . . . or $M_p^{(L)}$=min(x1, y1), min(x2, y2), min(x3, y3), . . . Similar to the method A, a method of determining $M_p^{(L)}$ is not restricted to the use of the maximum or minimum number of BD candidates of each CC. $M_p^{(L)}$ can be determined in a manner of mixing the maximum or minimum number of BD candidates according to a usage, a purpose and an AL. And, it may be able to use a random different value to determine the $M_p^{(L)}$. In this case, it may also be able to use an offset different from each other for an SS different from each other.

C. Method of Aggregating the A and the B with Each Other

A UE can perform BD on two or more DCI formats or two or more CCs. In this case, the number of BD candidates different from each other according to an AL can be assigned to each DCI format or each CC. Hence, a combination of the aforementioned proposed methods can be applied to the number of BD candidates different from each other according to an AL. In particular, in case of performing cross carrier scheduling, whether TM configuration defined according to a CC and/or a bandwidth and/or CP configuration and/or special SF configuration and/or the number of REs available for EPDCCH transmission to satisfy a predefined threshold value (e.g., 104 REs) may not be identical to each other. In this case, an SS (search space) can be configured by a scheme of aggregating BD candidate defined for each CC with each other using one of the aforementioned proposed methods.

Meanwhile, in case of performing cross carrier scheduling, it may be able to differently determine a method of aggregating BD candidate defined for each CC with each other according to a characteristic of the BD candidate. For instance, if each CC has BD candidates of an identical characteristic, an aggregation method A can be applied to the BD candidates. If each CC has BD candidates of a characteristic different from each other, it may be able to apply an aggregation method B to the BD candidates.

As a representative method of classifying BD candidates according to a characteristic, the BD candidates can be classified into three types according to a usage of a DCI format. As an example, the BD candidates can be classified into a DCI format class (i.e., Class 1) used for a downlink TM, a DCI format class (i.e., Class 2) used for fallback and a DCI format class (i.e., Class 3) used for an uplink TM. The method of classifying BD candidates can also be defined based on a predefined different rule. As an example, it may be able to define a rule enabling the DCI format class used for the uplink TM to be included in one of the DCI format class used for the fallback and the DCI format class used for the downlink TM.

In the following, for clarity, assume that DCI formats are classified into three classes (i.e., a DCI format class for a fallback usage, a DCI format class for a downlink TM usage and a DCI format class for an uplink TM usage). In the following, an example of DCI formats respectively corresponding to the predefined three types of classes is shown.

Class 1: DCI format 2 series, DCI format 1
Class 2: DCI format 0/1A
Class 3: DCI format 4

In case of performing cross carrier scheduling, a UE can perform blind decoding on two or more CCs and two or more DCI format classes on each CC. Hence, an SS in a specific AL can be configured by aggregating BD candidates belonging to an identical DCI format class with each other according to each CC and then aggregating SSs configured for each DCI format class with each other again. In this case, in case of configuring an SS including candidates for two or more CCs in response to one of the two or more DCI format classes, $M_{p,n^*}^{(L)}$ indicates EPDCCH set p, AL L and the number of candidates allocated to a CC n of the corresponding DCI format class.

For instance, if a UE is configured by a TM 1 on CC 1 and the UE is configured by a TM 9 on a CC 2, # of BD candidates for DCI format 0/1A corresponds to 6 on the CC #1, the # of BD candidates for DCI format 1 corresponds to 6 on the CC #1 # of BD candidates for DCI format 0/1A corresponds to 6 on the CC #2, the # of BD candidates for DCI format 2/2C corresponds to 2 on the CC #2.

Figure 12:
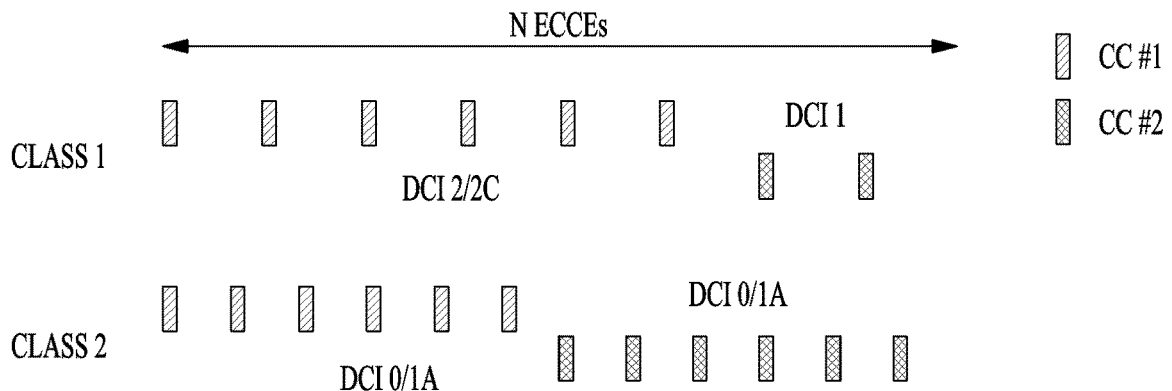
FIG. 12 is a diagram for an example of allocating PDCCH/EPDCCH candidate according to a CC in accordance with one embodiment of the present invention.

In this case, CCs belonging to an identical DCI format class are aggregated with each other using a method A. In Equation 1, $M_p^{(L)}$=x1+y1, m'=0,1, . . . ,(x1+y1) are applied. In this case, $M_p^{(L)}$ corresponds to the number of candidates included in the CC n of the corresponding DCI format class. If aggregation between DCI format classes different from each other is performed using a method B, an SS in AL=L can be configured as shown in FIG. 12. For clarity, it is assumed a relatively big $N_{ECCE,p,k}$ (# of ECCE) compared to L (AL) and the # of BD.

Figure 13:
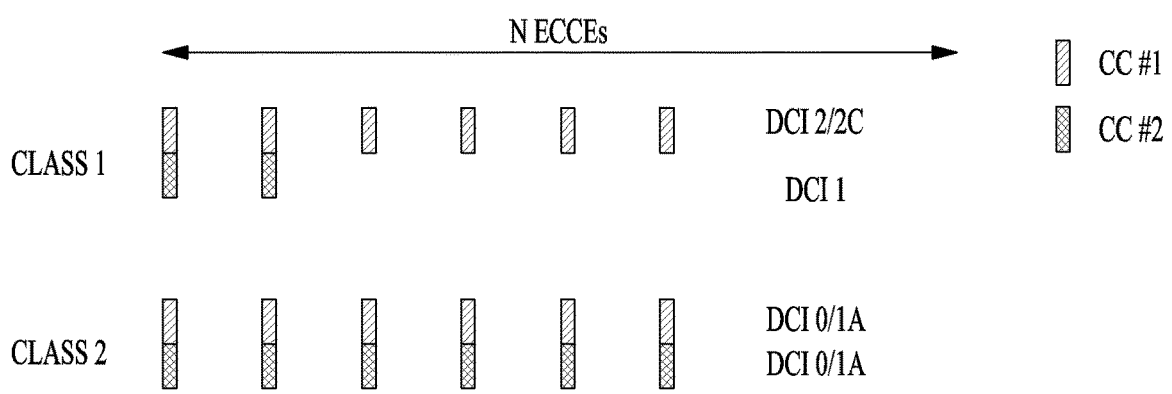
FIG. 13 is a diagram for an example of allocating PDCCH/EPDCCH candidate according to a CC in accordance with one embodiment of the present invention.

When CCs belonging to an identical DCI format class are aggregated with each other, if the aforementioned method A $$\left(M_p^{(L)} = M_{p,n^*}^{(L)}, n^* = \max_n(M_{p,n}^{(L)})\right)$$

is applied, in Equation 1, it becomes $M_p^{(L)}$=max (x1, y1), m'=0,1, . . . ,(x1+y1) If aggregation between DCI format classes different from each other is performed using the method B, an SS in AL=L can be configured as shown in FIG. 13.

Figure 14:
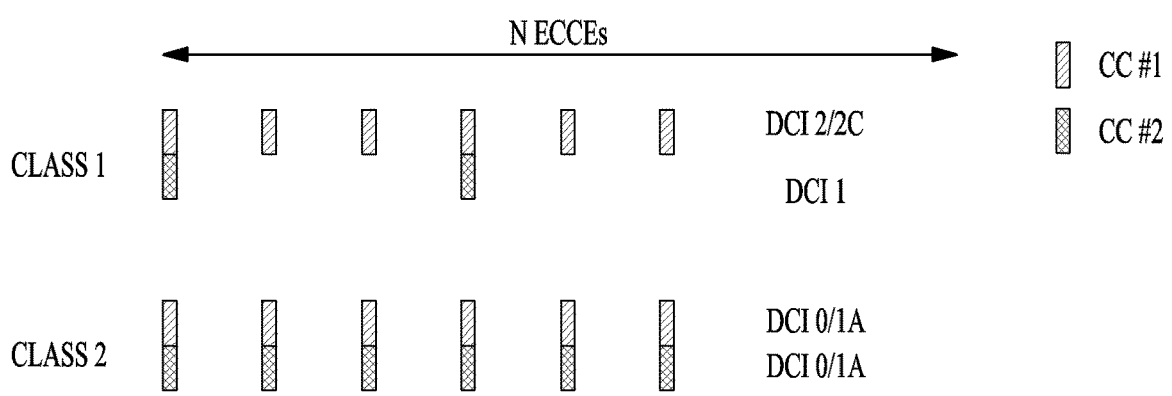
FIG. 14 is a diagram for an example of allocating PDCCH/EPDCCH candidate according to a CC in accordance with one embodiment of the present invention.

If $M_p^{(L)}=M_{p,n^*}^{(L)}$ is used for each DCI format class and each CC by using the method B for both aggregation of CCs between identical DCI format classes and aggregation between DCI format classes different from each other, an SS of AL=L can be configured as shown in FIG. 14.

In addition to the aforementioned embodiment, an SS in a specific AL can be configured by firstly configuring an SS of which BD candidates belonging to various DCI format classes are aggregated with each other and then aggregating SSs configured according to each CC with each other. In this case, it may also be able to use one of the aforementioned proposed methods as an aggregation method. In aggregating a DCI format class and a CC with each other, it may be able to use an identical aggregation scheme.

In order to mitigate positions of candidates for CCs different from each other to be localized into an adjacent ECCE, it is possible to make candidates according to a CC to be alternately positioned. To this end, it may be able to perform the aforementioned process in a unit of a set of candidates configured for each DCI format class. It may be able to use one the aforementioned alternate arrangement schemes as a concrete scheme. In this case, it may be able to apply an identical rule or a different rule according to each set. Meanwhile, as shown in FIG. 13, if $M_p^{(l)}$ is configured by the number of candidates of a specific CC, although candidates of CCs different from each other may collide with each other, the candidates according to each CC can be alternately distributed according to $N_{ECCE,p,k}$ value. In case of FIG. 14, candidates according to a CC can be alternately distributed by defining an offset according to a CC.

Method of Applying Localized/Distributed Transmission Scheme

When cross carrier scheduling is configured, a method of configuring an EPDCCH search space may vary according to a transmission mode. In this case, the method of configuring the EPDCCH search space (SS) can include the method of aggregating SSs with each other between CCs proposed earlier in the foregoing description. In particular, when the cross carrier scheduling is configured, an SS can be configured in a manner of aggregating BD candidates of each CC scheduled via corresponding EPDCCH with each other. In this case, it is able to respectively define an aggregation method used for localized transmission and an aggregation method used for distributed transmission according to a transmission method of EPDCCH.

In particular, among the proposed methods, it may be able to apply a method of making ECCEs corresponding to EPDCCH candidates of CCs different from each other to be alternately distributed on a whole SS to a localized transmission only and the method may not be applied to a distributed transmission. This is because an objective of the method is to prevent an EPDCCH candidate of a specific CC from being allocated to a physically adjacent resource area. Yet, in case of the distributed transmission, one ECCE is configured over a plurality of PRBs, a physical position between adjacent ECCEs is indexed to be distributed or a combination of ECCEs constructing EPDCCH can be defined to be distributed. In particular, in case of the distributed transmission, the method of making the ECCEs corresponding to the EPDCCH candidate of CCs different from each other to be alternately distributed does not have a special meaning.

Hence, among the proposed methods, in order to make the ECCEs corresponding to the EPDCCH candidate of CCs different from each other to be alternately distributed on a whole SS, a method of making the total number of candidates to be multiple (the number of CCs scheduled by a corresponding EPDCCH) of the number of candidates of a specific CC (CC including the maximum number of candidates) by introducing a null candidate can also be applied to the localized transmission only. And, the method may not be applied to the distributed transmission. In this case, $M_p^{(L)}$ defined for the localized transmission is different from $M_p^{(L)}$ defined for the distributed transmission.

Localized transmission scheme: $M_p^{(L)} = N \ast M_{p,n^\ast}^{(L)}$, in this case, N corresponds to the number of CCs scheduled by a corresponding EPDCCH. For each p, L, $$n^\ast = \max_n (M_{p,n}^{(L)})$$

Distributed transmission scheme:

$$M_p^{(L)} = \sum_n M_{p,n}^{(L)}$$

In particular, in case of the localized transmission scheme, $M_p^{(L)}$ value used in Equation 1 corresponds to a value of which the number of candidates of a CC including the maximum number of EPDCCH candidates multiplied by the number of CCs. Hence, positions of null candidates may occur as many as a difference between the value and the sum of the number of EPDCCH candidates of each CC. On the contrary, in case of the distributed transmission, $M_p^{(L)}$ value used in Equation 1 is determined by the sum of the number of EPDCCH candidates of each CC and ECCEs corresponding to EPDCCH candidates of each CC are contiguously positioned.

The method of configuring an SS according to a transmission mode can be summarized as follows. As mentioned in the foregoing description, whether to apply methods, which are required to alternately allocate ECCEs, can be determined according to a transmission mode and an SS configuration can be differentiated according to the method.

TABLE 14

| Transmission mode | ECCE interlacing | $M_p^{(L)}$ | m' |
|---|---|---|---|
| Localised | 0 | $M_p^{(L)} = N \ast M_{p,n^\ast}^{(L)}$ | $m' = m \cdot N + n_{CI}$ |
| Distributed | X | $M_p^{(L)} = \sum_n M_{p,n}^{(L)}$ | $m' = m + \sum_{k<n} M_{p,k}^{(L)}$ |

Meanwhile, it may be able to apply an identical SS configuration method to the distributed and localized transmission. Or, it may be able to apply a completely different aggregation method (one selected from the group consisting of aggregation method A, aggregation method B and a lower scheme) to the distributed and localized transmission as occasion demands. And, according to the proposed method, it may be able to differently define m' only for the distributed transmission while $M_p^{(L)}$ value is commonly used with the localized transmission $$\left( m' = m + \sum_{k<n} M_{p,k}^{(L)} \text{ or } m' = m + M_{p,n^\ast}^{(L)} \cdot n \right)$$

or it may be able to commonly use the $M_p^{(L)}$ value and the m' value with the localized transmission. On the contrary, the $M_p^{(L)}$ value, the m' value or a part of the values defined for the distributed transmission can be identically applied to the localized transmission.

Figure 15:
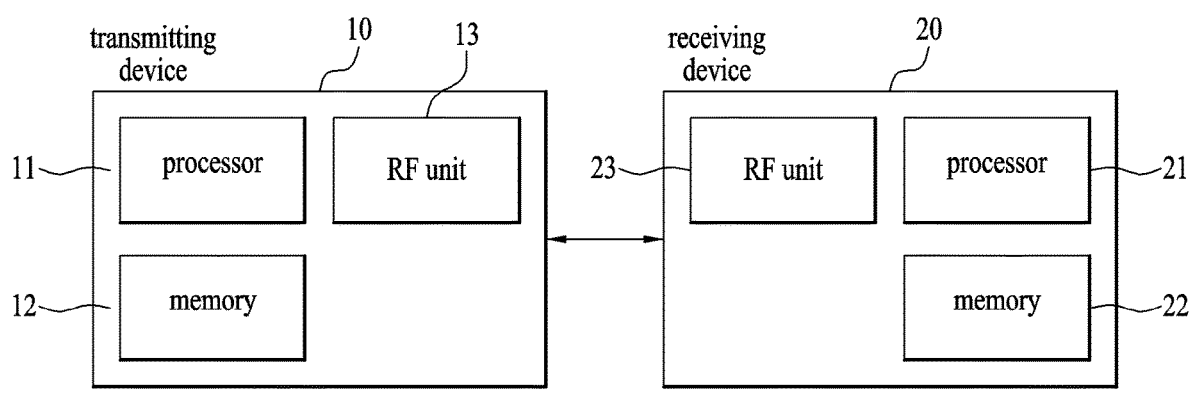
FIG. 15 is a block diagram for a device configured to implement embodiment(s) of the present invention.

FIG. 15 is a block diagram of a transmitting device 10 and a receiving device 20 configured to implement exemplary embodiments of the present invention. Referring to FIG. 15, the transmitting device 10 and the receiving device 20 respectively include radio frequency (RF) units 13 and 23 for transmitting and receiving radio signals carrying information, data, signals, and/or messages, memories 12 and 22 for storing information related to communication in a wireless communication system, and processors 11 and 21 connected operationally to the RF units 13 and 23 and the memories 12 and 22 and configured to control the memories 12 and 22 and/or the RF units 13 and 23 so as to perform at least one of the above-described embodiments of the present invention.

The memories 12 and 22 may store programs for processing and control of the processors 11 and 21 and may temporarily storing input/output information. The memories 12 and 22 may be used as buffers. The processors 11 and 21 control the overall operation of various modules in the transmitting device 10 or the receiving device 20. The processors 11 and 21 may perform various control functions to implement the present invention. The processors 11 and 21 may be controllers, microcontrollers, microprocessors, or microcomputers. The processors 11 and 21 may be implemented by hardware, firmware, software, or a combination thereof. In a hardware configuration, Application Specific Integrated Circuits (ASICs), Digital Signal Processors (DSPs), Digital Signal Processing Devices (DSPDs), Programmable Logic Devices (PLDs), or Field Programmable Gate Arrays (FPGAs) may be included in the processors 11 and 21. If the present invention is implemented using firmware or software, firmware or software may be configured to include modules, procedures, functions, etc. performing the functions or operations of the present invention. Firmware or software configured to perform the present invention may be included in the processors 11 and 21 or stored in the memories 12 and 22 so as to be driven by the processors 11 and 21.

The processor 11 of the transmitting device 10 is scheduled from the processor 11 or a scheduler connected to the processor 11 and codes and modulates signals and/or data to be transmitted to the outside. The coded and modulated signals and/or data are transmitted to the RF unit 13. For example, the processor 11 converts a data stream to be transmitted into K layers through demultiplexing, channel coding, scrambling and modulation. The coded data stream is also referred to as a codeword and is equivalent to a transport block which is a data block provided by a MAC layer. One transport block (TB) is coded into one codeword and each codeword is transmitted to the receiving device in the form of one or more layers. For frequency up-conversion, the RF unit 13 may include an oscillator. The RF unit 13 may include Nt (where Nt is a positive integer) transmit antennas.

A signal processing process of the receiving device 20 is the reverse of the signal processing process of the transmitting device 10. Under the control of the processor 21, the RF unit 23 of the receiving device 10 receives RF signals transmitted by the transmitting device 10. The RF unit 23 may include Nr receive antennas and frequency down-converts each signal received through receive antennas into a baseband signal. The RF unit 23 may include an oscillator for frequency down-conversion. The processor 21 decodes and demodulates the radio signals received through the receive antennas and restores data that the transmitting device 10 wishes to transmit.

The RF units 13 and 23 include one or more antennas. An antenna performs a function of transmitting signals processed by the RF units 13 and 23 to the exterior or receiving radio signals from the exterior to transfer the radio signals to the RF units 13 and 23. The antenna may also be called an antenna port. Each antenna may correspond to one physical antenna or may be configured by a combination of more than one physical antenna element. A signal transmitted through each antenna cannot be decomposed by the receiving device 20. A reference signal (RS) transmitted through an antenna defines the corresponding antenna viewed from the receiving device 20 and enables the receiving device 20 to perform channel estimation for the antenna, irrespective of whether a channel is a single RF channel from one physical antenna or a composite channel from a plurality of physical antenna elements including the antenna. That is, an antenna is defined such that a channel transmitting a symbol on the antenna may be derived from the channel transmitting another symbol on the same antenna. An RF unit supporting a MIMO function of transmitting and receiving data using a plurality of antennas may be connected to two or more antennas.

In embodiments of the present invention, a UE serves as the transmission device 10 on uplink and as the receiving device 20 on downlink. In embodiments of the present invention, an eNB serves as the receiving device 20 on uplink and as the transmission device 10 on downlink.

The transmitting device and/or the receiving device may be configured as a combination of one or more embodiments of the present invention.

The detailed description of the exemplary embodiments of the present invention has been given to enable those skilled in the art to implement and practice the invention. Although the invention has been described with reference to the exemplary embodiments, those skilled in the art will appreciate that various modifications and variations can be made in the present invention without departing from scope of the invention described in the appended claims. Accordingly, the invention should not be limited to the specific embodiments described herein, but should be accorded the broadest scope consistent with the principles and novel features disclosed herein.

INDUSTRIAL APPLICABILITY

The present invention may be used for a wireless communication apparatus such as a terminal, a relay and a base station (BS).

What is claimed is:

1. A method for receiving data channel by a user equipment (UE) in a wireless communication system, the method comprising:
    monitoring Enhanced Physical Downlink Control Channel (EPDCCH) candidates for a control channel to decode an EPDCCH in one or more EPDCCH sets on a first service cell configured for the UE;
    performing blind decoding on the EPDCCH candidates for the control channel; and
    receiving data channel based on the control channel,
    wherein the EPDCCH candidates for the control channel include first candidates for the first serving cell and second candidates for a second serving cell scheduled by the first serving cell,
    wherein a first set of aggregation levels and a first number of the second candidates are configured based on a bandwidth of the second serving cell being greater than a predetermined value,
    wherein a second set of the aggregation levels and a second number of the second candidates are configured based on the bandwidth of the second serving cell being smaller than the predetermined value,
    wherein the second set has a minimum aggregation level lower than a minimum aggregation level of the first set,
    wherein the first and second sets of aggregation levels are related to a number of enhanced control channel elements on which the EPDCCH is transmitted, and
    wherein positions of the first candidates and positions of the second candidates are configured to have an interval, based on a cell index of the first serving cell and a cell index of the second serving cell.

2. The method of claim 1, wherein a configuration related to a frequency range for the first serving cell is used for configuring aggregation levels of the first serving cell and a number of the first candidates.

3. The method of claim 1, wherein a configuration related to a frequency range for the second serving cell is used for configuring the first and second sets of aggregation levels and the first and second number of the second candidates.

4. The method of claim 1, wherein two search space sets including a first search space set and a second search space set are configured on the first serving cell.

5. The method of claim 4, wherein a number of candidates for the control channel at each aggregation level of the first search space set is different from a number of candidates for the control channel at each aggregation level of the second search space set.

6. The method of claim 4, wherein each of the two search space sets is related to a preconfigured number of physical resource block (PRB) pairs.

7. A user equipment (UE) for receiving data channel in a wireless communication system, the UE comprising:
    a transmitter for transmitting a signal,
    a receiver for receiving a signal; and
    at least one processor controlling the transmitter and the receiver,
    wherein the at least one processor is configured to:
    monitor Enhanced Physical Downlink Control Channel (EPDCCH) candidates for a control channel to decode an EPDCCH in one or more EPDCCH sets on a first service cell configured for the UE,
    perform blind decoding on the EPDCCH candidates for the control channel, and
    control the receiver to receive data channel based on the control channel, wherein the EPDCCH candidates for the control channel include first candidates for the first serving cell and second candidates for a second serving cell scheduled by the first serving cell, wherein a first set of aggregation levels and a first number of the second candidates are configured based on a bandwidth of the second serving cell being greater than a predetermined value, wherein a second set of the aggregation levels and a second number of the second candidates are configured based on the bandwidth of the second serving cell being smaller than the predetermined value, wherein the second set has a minimum aggregation level lower than a minimum aggregation level of the first set, wherein the first and second sets of aggregation levels are related to a number of enhanced control channel elements on which the EPDCCH is transmitted, and wherein positions of the first candidates and positions of the second candidates are configured to have an interval, based on a cell index of the first serving cell and a cell index of the second serving cell.

8. The UE of claim 7, wherein a configuration related to a frequency range for the first serving cell is used for configuring aggregation levels of the first serving cell and a number of the first candidates.

9. The UE of claim 7, wherein a configuration related to a frequency range for the second serving cell is used for configuring the first and second sets of aggregation levels and the first and second number of the second candidates.

10. The UE of claim 7, wherein two search space sets including a first search space set and a second search space set are configured on the first serving cell.

11. The UE of claim 10, wherein a number of candidates for the control channel at each aggregation level of the first search space set is different from a number of candidates for the control channel at each aggregation level of the second search space set.

12. The UE of claim 10, wherein each of the two search space sets is related to a preconfigured number of physical resource block (PRB) pairs.

13. An Apparatus for receiving data channel in a wireless communication system, the apparatus comprising:
a memory; and
at least one processor coupled to the memory and configured to:
monitor Enhanced Physical Downlink Control Channel (EPDCCH) candidates for a control channel to decode an EPDCCH in one or more EPDCCH sets on a first service cell configured for the UE,
perform blind decoding on the EPDCCH candidates for the control channel, and
receive data channel based on the control channel,
wherein the EPDCCH candidates for the control channel include first candidates for the first serving cell and second candidates for a second serving cell scheduled by the first serving cell,
wherein a first set of aggregation levels and a first number of the second candidates are configured based on a bandwidth of the second serving cell being greater than a predetermined value,
wherein a second set of the aggregation levels and a second number of the second candidates are configured based on the bandwidth of the second serving cell being smaller than the predetermined value,
wherein the second set has a minimum aggregation level lower than a minimum aggregation level of the first set,
wherein the first and second sets of aggregation levels are related to a number of enhanced control channel elements on which the EPDCCH is transmitted, and
wherein positions of the first candidates and positions of the second candidates are configured to have an interval, based on a cell index of the first serving cell and a cell index of the second serving cell.

* * * * *